(12) United States Patent
Tsurumi

(10) Patent No.: US 8,094,204 B2
(45) Date of Patent: Jan. 10, 2012

(54) IMAGE MOVEMENT BASED DEVICE CONTROL METHOD, PROGRAM, AND APPARATUS

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 11/844,191

(22) Filed: Aug. 23, 2007

(65) Prior Publication Data
US 2008/0050035 A1 Feb. 28, 2008

(30) Foreign Application Priority Data

Aug. 28, 2006 (JP) .................................. 2006-231154
Jan. 25, 2007 (JP) .................................. 2007-015445

(51) Int. Cl.
*H04N 5/228* (2006.01)
(52) U.S. Cl. ............. 348/222.1; 348/208.1; 348/333.01
(58) Field of Classification Search ............... 348/207.1, 348/208.1, 208.3, 222.1, 333.01
See application file for complete search history.

(56) References Cited

U.S. PATENT DOCUMENTS

| | | | | |
|---|---|---|---|---|
| 6,411,275 | B1 * | 6/2002 | Hedberg | 348/36 |
| 6,552,744 | B2 * | 4/2003 | Chen | 348/218.1 |
| 6,937,272 | B1 * | 8/2005 | Dance | 348/208.2 |
| 2001/0026318 | A1 * | 10/2001 | Yonezawa et al. | 348/159 |
| 2004/0085455 | A1 * | 5/2004 | Silverstein | 348/211.4 |
| 2006/0177103 | A1 * | 8/2006 | Hildreth | 348/208.99 |
| 2006/0181510 | A1 * | 8/2006 | Faith | 345/158 |

FOREIGN PATENT DOCUMENTS

| | | |
|---|---|---|
| JP | 6-50758 | 2/1994 |
| JP | 09-214945 | 8/1997 |
| JP | 2000-267799 | 9/2000 |
| JP | 2002-164990 | 6/2002 |
| JP | 2004-145527 | 5/2004 |
| JP | 2005-158057 | 6/2005 |
| JP | 2006-99228 | 4/2006 |

OTHER PUBLICATIONS

Office Action mailed by Japanese Patent Office on Jan. 4, 2011, in Japanese patent application No. 2007-015445.

* cited by examiner

*Primary Examiner* — Gevell Selby
(74) *Attorney, Agent, or Firm* — Finnegan, Henderson, Farabow, Garrett & Dunner, L.L.P.

(57) ABSTRACT

An information processing apparatus of the present invention includes a shot image obtaining portion, an image processing portion, a data conversion portion and a control portion. The shot image obtaining portion includes an imaging element and obtains a shot image in a time-series from the imaging element. The image processing portion performs image processing on the shot image and analyzes movement of the shot image resulting from movement of the information processing apparatus. The data conversion portion converts the analyzed movement of the shot image into control data, and the control portion controls functions based on the control data.

22 Claims, 23 Drawing Sheets

INSTRUMENT WINDOW

EXPANDED PHOTOGRAPH

WEB PAGE

PHOTOGRAPH DISPLAY

MAP

RELATIONSHIP OF MOVEMENT DIRECTION AND ISSUED COMMAND

IMAGE MOVEMENT BASED DEVICE CONTROL METHOD, PROGRAM, AND APPARATUS

CROSS REFERENCES TO RELATED APPLICATIONS

The present invention contains subject matter related to Japanese Patent Applications JP 2006-231154 filed in the Japan Patent Office on Aug. 28, 2006 and JP 2007-15445 filed in the Japan Patent Office on Jan. 25, 2007, the entire contents of which being incorporated herein by reference.

BACKGROUND OF THE INVENTION

1. Field of the Invention

The present invention relates to an information processing apparatus, an imaging apparatus, an information processing system, a device control method and a program.

2. Description of the Related Art

Devices like personal computers and mobile terminals are provided with a display screen, and a pointer for selecting icons or the like is displayed on the display screen. Normally, operations like moving the pointer or scrolling the display screen are performed by operating buttons provided on the device.

Japanese Patent Application Publication No. JP-A-6-50758 discloses, for example, a technology in which details of an operation are displayed based on detection of displacement, speed or acceleration using a vibrating gyroscope. Moreover, Japanese Patent Application Publication No. JP-2006-99228 discloses a technology in which, when a mobile terminal is operated, the movement of a finger used for operation is detected and used as a basis for moving the display position of a pointer of a display screen.

SUMMARY OF THE INVENTION

However, methods that use a vibrating gyroscope to detect displacement, or the like, require a vibrating gyroscope to be provided inside the device, which is liable to make the structure of the device more complicated and larger. On the other hand, methods that detect the movement of a finger require a detection sensor to be provided, which of course makes the device more complicated and larger. In addition, methods that detect the movement of a finger are unable to detect larger movement amounts, and thus when the movement amount of the pointer or the scroll amount of the screen is large, operation becomes troublesome.

In the case of methods that perform control using operation buttons provided on a device, when a function of the device other than one related to the display screen is controlled, operation is complicated and thus it is not possible to perform the operation extremely rapidly.

The present invention addresses the above-identified and other problems associated with the known methods and devices, and provides a new and innovative information processing apparatus that can control functions of an apparatus using a simple structure. The present invention also provides an imaging apparatus, an information processing system, an apparatus control method, and a program for the same.

According to an embodiment of the present invention, there is provided an information processing apparatus including: a shot image obtaining portion, including an imaging element, that obtains a shot image in a time-series from the imaging element; an image processing portion that performs image processing on the shot image and analyzes movement of the shot image resulting from movement of the information processing apparatus; a data conversion portion that converts the analyzed movement of the shot image into control data; and a control portion that controls functions based on the control data.

According to the above-described structure, the shot image obtained in time-series from the imaging element is image processed, and the movement of the shot image resulting from movement of the information processing apparatus is analyzed. Then, the analyzed movement of the shot image is converted into control data, and the control data is used as a basis for controlling the functions of the information processing apparatus. Thus, the movement of the information processing apparatus can be used to control the information processing apparatus.

In the above-described structure, the image processing portion may analyze the movement of the time-series of the shot image by setting a plurality of feature points in the shot image, and deriving a time-series of movement of the feature points using optical flow processing. In the above-described structure, the plurality of feature points are set in the shot image, and optical flow processing is used to derived the time series of the movement of the feature points, thus allowing the movement of the time-series of the shot image to be analyzed. Because optical flow processing is suitable for detection of the feature points, setting of the feature points in the shot image allows the movement of the shot image in the time-series to be accurately detected.

In addition, a structure may be adopted in which the image processing portion includes an affine matrix computation portion, and an affine matrix selection portion. The affine matrix computation portion computes a plurality of affine matrixes that represent the relationship of positions of feature points in a present frame and positions of feature points in a frame one before using feature points selected at random. The affine matrix selection portion computes the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the aforementioned difference is equal to or less than the determined threshold value. The movement of the shot image in the time-series may then be analyzed based on the affine matrix that is selected by the affine matrix selection portion. If this structure is adopted, the affine matrix that most accurately represents the movement of each feature point can be derived from the affine matrixes that represent the movement of each feature point. Thus, an affine matrix can be computed based upon the feature points that most dominantly reflect the movement of the information processing apparatus, and the movement of the other feature points can be taken to be computationally irrelevant. Accordingly, the movement of the shot image can be accurately analyzed.

Furthermore, the information processing portion may include a movement classification portion that classifies the movement of the shot image into at least one classification type including movement in a direction orthogonal to an optical axis of an optical system that images a target object on the imaging element, rotation around the optical axis, and enlargement/contraction. The data conversion portion may then convert the movement of the analyzed shot image into the control data such that the control data differs depending on the classification type of the movement of the shot image. In this structure, the movement of the shot image is classified into at least one of the classification types, namely, movement in the direction orthogonal to the optical axis of the imaging optical system, rotation around the optical axis, and enlargement/contraction, and then the movement is converted into different control data depending on the classification type of the movement of the shot image. Accordingly, the type of movement of the information processing apparatus can be changed so that the different functions of the information processing apparatus are operated in accordance with the classification type of the movement of the shot image.

The information processing apparatus may also include a switch that is operable by a user, and the data conversion portion may variably change the control data based on an operating state of the switch. If this structure is adopted, the control data can be variably changed based on the operating state of the switch. Accordingly, the movement of the shot image and the operating state of the switch can be used in combination to control the functions of the information processing apparatus. Thus, the various functions provided in the information processing apparatus can be optimally controlled.

The information processing apparatus may also include a display portion that displays information, and the control portion may control operation of a pointer displayed on the display portion based on the control data. If this structure is adopted, the pointer displayed on the display portion can be controlled based on the control data, and thus the operation of the pointer can be controlled by moving the information processing apparatus and without having to perform troublesome operations.

In addition, the information processing apparatus may also include a display portion that displays information, and the control portion may control scrolling of a screen displayed on the display portion based on the control data. If this structure is adopted, scrolling of the screen displayed on the display portion can be controlled based on the control data, and thus scrolling of the screen can be performed by moving the information processing apparatus and without having to perform troublesome operations.

Moreover, the control portion may execute a direct command including starting up and shutting down the information processing apparatus based on the control data. If this structure is adopted, a direct command including starting up or shutting down the information processing apparatus can be performed based on the control data. Thus, a direct command can be executed by moving the information processing apparatus and without having to perform troublesome operations.

The information processing apparatus may also include a display portion that displays information. A painting tool that indicates a painting position may be displayed at a determined position on the display portion, and the control portion may use the control data as a basis for moving one of the painting tool and a background screen displayed on the display portion such that paint is applied to the background screen at the position of the painting tool. In this structure, the painting tool that indicates the painting position is displayed at the determined position of the display portion, and the control data is used as a basis for moving the painting tool or the background screen displayed on the display portion such that paint is applied to the background screen at the position of the painting tool. Accordingly, painting of the background screen can be performed by moving the information processing apparatus and without having to perform troublesome operations.

Moreover, the information processing apparatus may also include a movement information attachment portion that attaches movement information to each one of a plurality of the shot images obtained in the time-series, the movement information being related to the movement of the shot images that is analyzed by the image processing portion; and an image synthesis portion that synthesizes the plurality of shot images based on the movement information related to the movement of the shot images. In this structure, the movement information related to the movement of the shot images analyzed by the image processing portion is attached to each one of the plurality of shot images obtained in time-series, and then the movement information related to the movement of the image data is used as a basis for synthesizing the plurality of shot images. Thus, positional alignment of the plurality of shot images obtained in time-series can be performed more accurately.

According to another embodiment of the present invention, there is provided an information processing apparatus that is connected to an imaging apparatus by either a wired or a wireless connection. The information processing apparatus includes a shot image receiving portion that receives a shot image obtained in time-series from the imaging apparatus; an image processing portion that performs image processing on the shot image and analyzes movement of the shot image resulting from movement of the imaging apparatus; a data conversion portion that converts the analyzed movement of the shot image into control data; and a control portion that controls functions based on the control data.

According to the above-described structure, the shot images obtained in the time-series are received from the imaging apparatus, and then image processing is performed on the shot images and the movement of the shot image resulting from movement of the imaging apparatus is analyzed. Then, the analyzed movement of the shot image is converted to control data, and the control data is used as a basis to control the functions of the information processing apparatus. Accordingly, the imaging apparatus that is provided as a separate unit from the information processing apparatus can be moved in order to control the information processing apparatus.

In addition, the information processing apparatus may also include a display portion that displays information, and the control portion may control operation of a pointer displayed on the display portion based on the control data. If this structure is adopted, the pointer displayed on the display portion of the information processing apparatus can be controlled based on the control data, and thus the operation of the pointer can be controlled by moving the imaging apparatus and without having to perform troublesome operations.

Moreover, the information processing apparatus may also includes a display portion that displays information, and the control portion may control scrolling of a screen displayed on the display portion based on the control data. If this structure is adopted, scrolling of the screen displayed on the display portion of the information processing apparatus can be controlled based on the control data, and thus scrolling of the screen can be performed by moving the imaging apparatus and without having to perform troublesome operations.

According to another embodiment of the present invention, there is provided an imaging apparatus that is connected to an information processing apparatus by either a wired or a wireless connection. The imaging apparatus includes a shot image obtaining portion, including an imaging element, that obtains a shot image in a time-series from the imaging element; an image processing portion that performs image processing on the shot image and analyzes movement of the shot image resulting from movement of the imaging apparatus; a data conversion portion that converts the analyzed movement of the shot image into control data; and a transmission portion that transmits the control data to the information processing apparatus for use in controlling functions of the information processing apparatus.

According to the above-described structure, the shot image in the time-series are obtained from the imaging element, and then image processing is performed on the shot image and the movement of the shot image resulting from movement of the imaging apparatus is analyzed. Then, the analyzed movement of the shot image is converted to control data, and the control data is transmitted to the information processing apparatus for use in controlling the functions of the information processing apparatus. Accordingly, the information processing apparatus that is provided as a separate unit from the imaging apparatus can be controlled by moving the imaging apparatus.

According to another embodiment of the present invention, there is provided an information processing system including an imaging apparatus and an information processing apparatus, the imaging apparatus connected to the information processing apparatus by one of a wired and a wireless connection. In the information processing system, the imaging apparatus includes: a shot image obtaining portion, including an imaging element, that obtains a shot image in a time-series from the imaging element; an image processing portion that performs image processing on the shot image and analyzes movement of the shot image resulting from movement of the imaging apparatus, a data conversion portion that converts the analyzed movement of the shot image into control data, and a transmission portion that transmits the control data to the information processing apparatus for use in controlling functions of the information processing apparatus. Moreover, the information processing apparatus includes a receiving portion that receives the control data from the imaging apparatus, and a control portion that controls functions based on the control data.

According to the above described structure, the imaging apparatus obtains the shot image in the time-series from the imaging element, performs image processing on the shot image and analyzes the movement of the shot image resulting from the movement of the imaging apparatus. Then, the analyzed movement of the shot image is converted to the control data, which is transmitted to the information processing apparatus for use in controlling functions of the information processing apparatus. The information processing apparatus receives the control data and uses the control data as a basis for controlling functions of the information processing apparatus. Therefore, the imaging apparatus connected to the information processing apparatus can be moved to control the information processing apparatus. Further, there is no need to analyze the movement of the image data in the information processing apparatus, which means that the structure of the information processing apparatus can be simplified.

According to another embodiment of the present invention, there is provided an information processing system including an imaging apparatus and an information processing apparatus, the imaging apparatus connected to the information processing apparatus by one of a wired and a wireless connection. In the information processing system, the imaging apparatus includes: a shot image obtaining portion, including an imaging element, that obtains a shot image in a time-series from the imaging element; and a shot image transmission portion that transmits the shot image to the information processing apparatus. Moreover, the information processing apparatus includes: a shot image receiving portion that receives the shot image; an image processing portion that performs image processing on the shot image and analyzes movement of the shot image resulting from movement of the imaging apparatus; a data conversion portion that converts the analyzed movement of the shot image into control data; and a control portion that controls functions based on the control data.

According to the above-described structure, the imaging apparatus obtains the shot image in the time-series from the imaging element, and transmits the shot image to the information processing apparatus. The information processing apparatus then performs image processing on the shot image received from the imaging apparatus, and analyzes the movement of the shot image resulting from movement of the imaging apparatus. Then, the analyzed movement of the shot image is converted to the control data, and the functions of the information processing apparatus are controlled based on the control data. Accordingly, the imaging apparatus connected to the information processing apparatus can be moved to control the information processing apparatus. In addition, there is no need to analyze the movement of the shot image in the imaging apparatus, and thus the structure of the imaging apparatus can be simplified.

According to another embodiment of the present invention, there is provided an apparatus control method including the steps of: obtaining a shot image in a time-series from an imaging element; performing image processing on the shot image and analyzing movement of the shot image resulting from movement of an apparatus that shot the shot image; converting the analyzed movement of the shot image into control data; and controlling functions of the apparatus or functions of another apparatus connected to the apparatus based on the control data.

According to this structure, image processing is performed on the shot image obtained in time-series from the imaging element, and the movement of the shot image resulting from movement of the apparatus that shot the shot image is analyzed. Then, the movement of the shot image is converted into control data, and the control data is used as a basis for controlling the functions of the apparatus that shot the shot image or the functions of the other apparatus connected to the apparatus. Thus, the apparatus that shot the shot image can be moved to control the functions of the moving apparatus itself, or the functions of the separate apparatus that is connected to the apparatus.

According to another embodiment of the present invention, there is provided a program that includes instructions that command a computer to function as: an obtaining portion that obtains a shot image in a time-series from an imaging element; a processing-analysis portion that performs image processing on the shot image and analyzes movement of the shot image resulting from movement of an apparatus including the imaging element; a conversion portion that converts the analyzed movement of the shot image into control data; and a control portion that controls functions based on the control data.

According to the above-described structure, the shot image obtained in the time-series from the imaging element is image processed and then the movement of the shot image resulting from movement of the apparatus including the imaging element is analyzed. Then, the analyzed movement of the shot image is converted into control data, and the control data is used as a basis for controlling the functions of the apparatus. Accordingly, the apparatus including the imaging element can be moved to control the apparatus.

According to another embodiment of the present invention, there is provided a program that includes instructions that command a computer to function as: a receiving portion that receives a shot image obtained in a time-series from an imaging apparatus; a processing-analysis portion that performs image processing on the shot image and analyzes movement of the shot image resulting from movement of the imaging apparatus; a conversion portion that converts the analyzed movement of the shot image into control data; and a control portion that controls functions based on the control data.

According to the above-described structure, the shot image obtained in the time-series is received from the imaging apparatus. Then, the shot image is image processed and the movement of the shot image resulting from movement of the imaging apparatus is analyzed. Then, the analyzed movement of the shot image is converted into control data, and the control data is used as a basis for controlling the functions of an apparatus. Accordingly, the shot image can be received from the separately provided imaging apparatus and used to control the functions of the apparatus that receives the shot image.

According to the embodiments of the present invention, there are provided a new and innovative information processing apparatus, an imaging apparatus, an information processing system, an apparatus control method, and a program that can control functions of an apparatus using a simple structure.

DETAILED DESCRIPTION OF THE PREFERRED EMBODIMENTS

Figure 1:
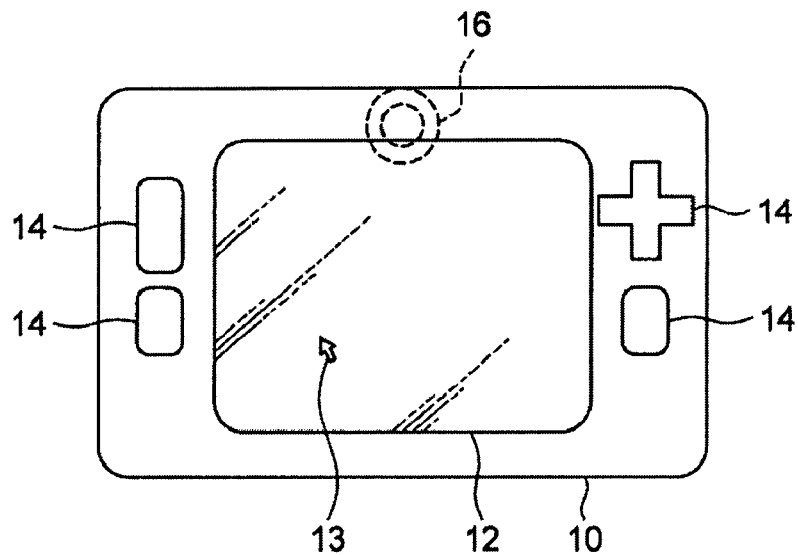
FIG. 1 is a schematic diagram showing an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Next, a first embodiment of the present invention will be explained. FIG. 1 is a schematic diagram of an information processing apparatus 10 according to the first embodiment. The information processing apparatus 10 is a small-sized mobile terminal (portable personal computer) that includes a personal computer function. A display screen 12 is provided in the center of the information processing apparatus 10. FIG. 1 shows a state in which a pointer 13 for operating icons or the like is displayed on the display screen 12.

Various types of buttons 14 are provided around the periphery of the display screen 12 and used for operating the various types of function of the information processing apparatus 10. A rear view camera 16 is provided on the rear side from the surface where the display screen 12 is provided.

The rear view camera 16 is provided with an imaging optical system and an imaging element like a CCD. In the rear view camera 16, the object that is the subject of the imaging optical system is imaged on the imaging element, and data for the image is obtained using photoelectric conversion. Because the rear view camera 16 is provided on the rear surface from the display screen 12, the user of the information processing apparatus 10 can point the rear view camera 16 toward the subject object to obtain data for the image while being able to view and recognize the display of the display screen 12.

Note that, in each embodiment described below, because the various functions of the information processing apparatus 10 are controlled in accordance with movement of the shot image that is shot by the rear view camera 16, the image that is shot by the rear view camera 16 is not usually displayed on the display screen 12. However, it will be readily apparent that the settings can be changed by operation state of the buttons 14 etc. so that all or part of the image that is shot by the rear view camera 16 is displayed on the display screen 12. Moreover, although the rear view camera 16 is provided on the rear surface from the display screen 12 in this example, the camera may be provided on the front surface side (the display screen 12 side).

Figure 2:
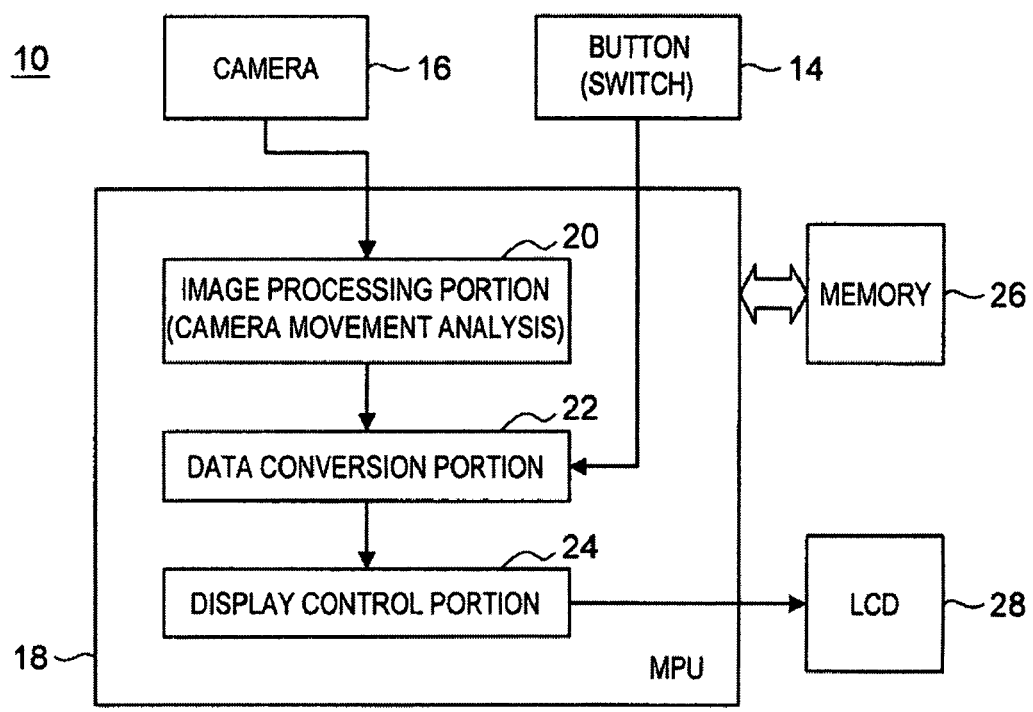
FIG. 2 is a block diagram showing the structure of the information processing apparatus.

FIG. 2 is a block diagram showing the configuration of the information processing apparatus 10. Referring to FIG. 2, the information processing apparatus 10 is provided with an MPU 18. The MPU 18 includes an in-built image processing portion 20, a data conversion portion 22, and a display control portion 24. The buttons 14, the rear view camera 16, a memory 26, and a liquid crystal display (LCD) 28 are connected to the MPU 18. The above-described display screen 12 is structured by the liquid crystal display 28. The functional block including the image processing portion 20, the data conversion portion 22, and the display control portion 24 etc. is configured by a computer system predominantly including the MPU 18 as hardware, and a computer program (software) that is stored in the MPU 18 or in an external ROM or the like.

The rear view camera 16 shoots the target object in a time-series. The image data for the shot images obtained by the rear view camera 16 are transmitted to the image processing portion 20, and then the shot images are stored inside the memory 26. In the image processing portion 20, the image data is image processed, and the motion of the image data caused by the movement of the rear view camera 16 (in other words, by movement of the information processing apparatus 10) is analyzed. At this time, data for the image of the previous frame stored in the memory 26 and the data for the image of the latest frame are used to perform analysis.

The movement information for the information processing apparatus 10 analyzed by the image processing portion 20 is transmitted to the data conversion portion 22. Then, information including the state of applications that are provided in the information processing apparatus 10 and the operation state of the buttons 14 (for example, if the rear view camera 16 is provided with a zoom lens, the position of the zoom lens) are input to the data conversion portion 22.

The data conversion portion 22 converts the movement analyzed by the image processing portion 20 into control data for controlling the information processing apparatus 10. More specifically, the data conversion portion 22 has a function that computes a parameter for operating the information processing apparatus 10 in accordance with the analyzed motion of the image data (the movement of the information processing apparatus 10). In addition, the data conversion portion 22 outputs different control data in accordance with the state of the applications, and the operations of the buttons 14.

The control data computed by the data conversion portion 22 is used as a basis for various operations of the information processing apparatus 10. Accordingly, the various operations of the information processing apparatus 10 can be performed based on the movement of the information processing apparatus 10. Note that, examples of the various operations of the information processing apparatus 10 include executing direct commands such as moving the pointer 13 displayed on the display screen 12, scrolling the window displayed on the display screen 12, start up/shut down the information processing apparatus 10.

In the first embodiment, the movement of the pointer 13 displayed on the display screen 12 is controlled in accordance with the movement of the information processing apparatus 10. Thus, the data conversion portion 22 computes a movement amount and direction for the pointer 13 in accordance with the movement of the information processing apparatus 10, while taking into consideration the state of the applications. The display control portion 24 controls the display of the display screen 12 based on the movement amount and direction computed by the data conversion portion 22 such that the pointer 13 moves on the display screen 12.

In this manner, the information processing apparatus 10 of the present embodiment is provided with a function that analyses the movement of the information processing apparatus 10 itself based on the image shot by the rear view camera 16, and moves the pointer 13 displayed on the display screen 12 based upon this analysis.

Accordingly, the user of the information processing apparatus 10 can move the information processing apparatus 10 held in his/her hands to move the pointer 13 to a desired position. Thus, there is no need to perform troublesome button operations, and the movement of the pointer 13 can be achieved extremely rapidly and easily. In addition, because the movement direction and the movement amount of the information processing apparatus 10 and the movement amount and the movement direction of the pointer 13 are the same, the user can move the pointer 13 by exactly an intended movement amount/in an intended movement direction.

Moreover, in the present embodiment, if the buttons 14 are operated in conjunction with moving the pointer 13, the pointer 13 can perform a drag and drop function. For example, the pointer 13 may be placed above an icon displayed on the display screen 12, and a determined one of the buttons 14 pressed in order to pick up the icon to perform a drag command in which the icon is dragged by the pointer 13. Then, the information processing apparatus 10 may be moved while the determined button 14 is pressed down to move the pointer 13, whereby the picked-up icon is dragged while picked up. Once the icon has been moved to the desired position, the operation of the determined button 14 is stopped to drop the icon.

Figure 3:
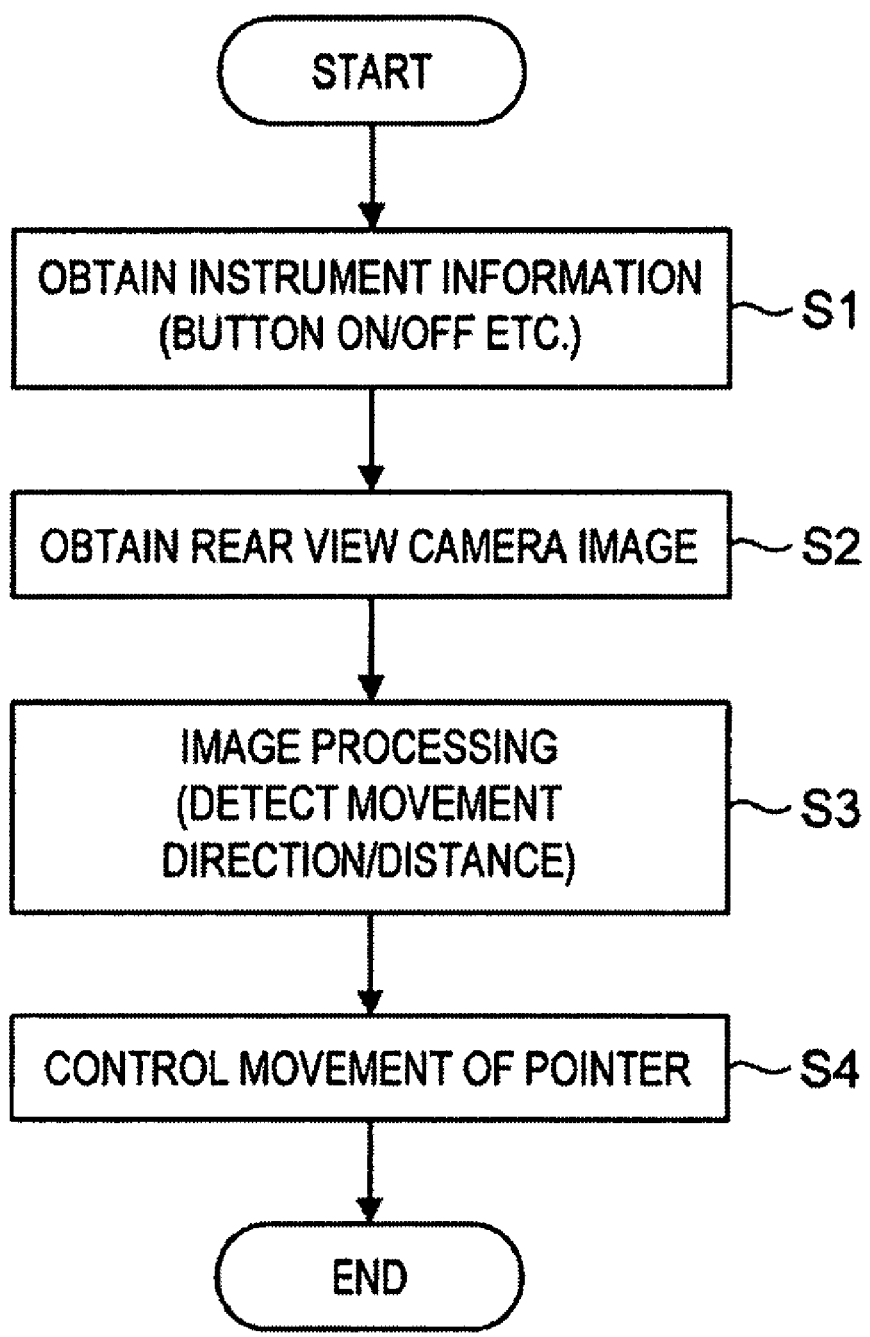
FIG. 3 is a flow chart that shows an outline of processing performed by the information processing apparatus of the first embodiment.

FIG. 3 is a flow chart that shows an outline of the processing performed by the information processing apparatus 10 of the present embodiment. Note that, the basic outline of the processing performed by second to fifth embodiments explained hereinafter is the same as the flow shown in FIG. 3. First, in step S1, each type of information for the information processing apparatus 10 is obtained. Here, the information obtained includes the operation state of the buttons 14, the state of each type of application, and the like. At step S1, it is detected whether the button 14 that has the drag and drop function is pressed.

At the next step S2, the image shot by the rear view camera 16 is obtained. Then, at the following step S3, the data image is processed to detect the movement direction, the movement distance and the like of the image. Note that, as will be described hereinafter, optical flow processing is used to analyze the movement direction, the movement distance etc. of the image.

Next, at step S4, the movement direction and the movement distance of the image detected at step S3 are used as a basis for computing a movement amount and a movement direction of the pointer 13, which are control data for the pointer 13. At this time, if it is detected at step S1 that the button 14 having the drag function is pressed down, the icon, background or the like on the screen that is picked up is dragged and moved by the pointer 13. Following step S4, the processing ends.

The processing of FIG. 3 analyzes the movement of the image shot by the rear view camera 16 in order to analyze the movement of the information processing apparatus 10. Based on this, the movement of the pointer 13 can be controlled. In addition, the buttons 14 can be operated in conjunction in order to use the pointer 13 to perform operations like dragging or the like.

Figure 4:
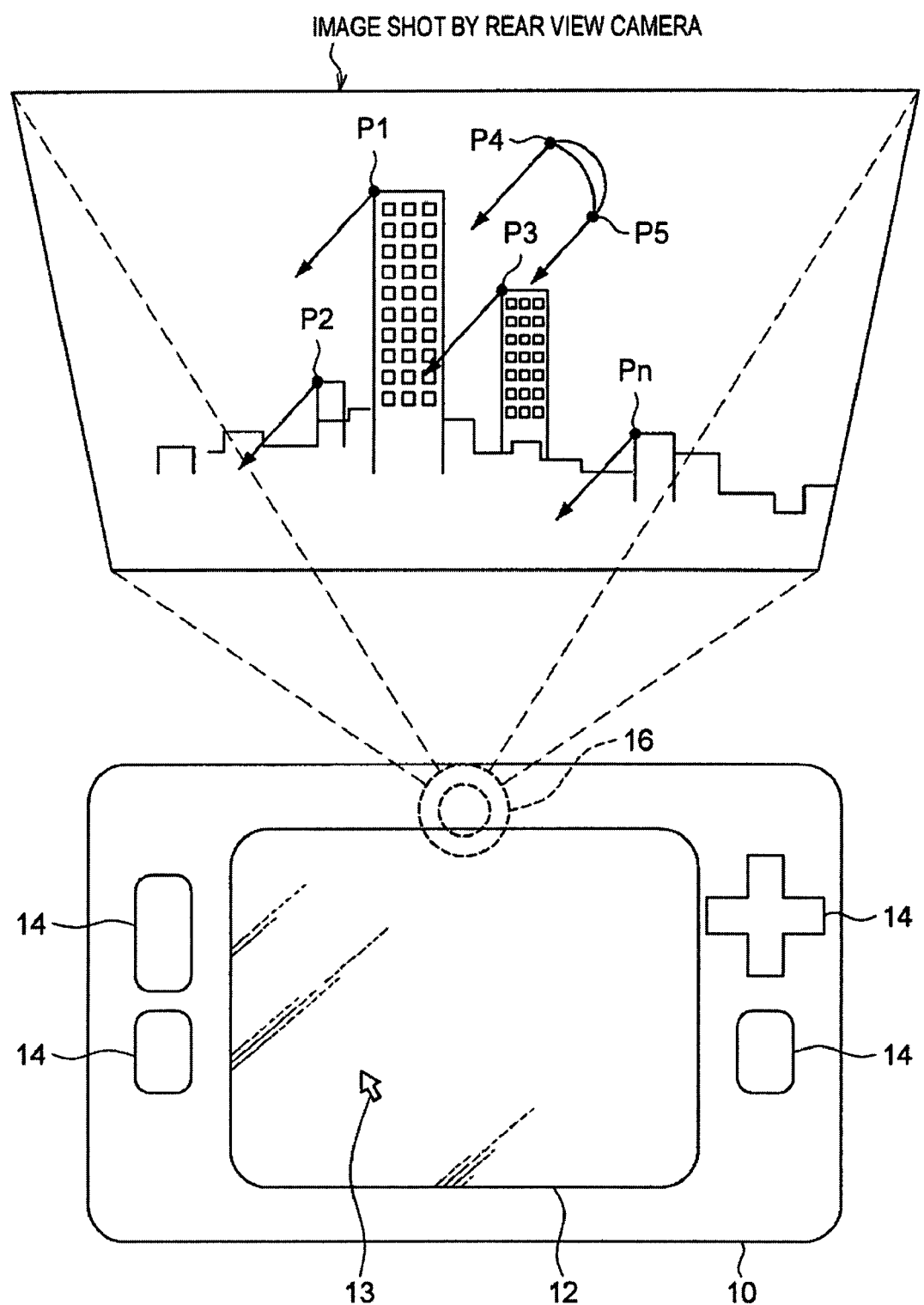
FIG. 4 is a schematic diagram showing the information processing apparatus and an image that is shot by a rear view camera.

FIG. 4 is a schematic diagram showing the information processing apparatus 10, and the image that is shot by the rear view camera 16. The rear view camera 16 shots the image at a determined time interval to obtain frames of the image in time-series. Analysis of the movement of shot image is performed using optical flow processing by analyzing the movement of a section within the shot image in each time-series frame that has been obtained. At this time, in the present embodiment, a feature point is selected from within image data that has strong features from the point of view of optical flow computation, and then optical flow processing based on Lucas Kanade (LK) method is performed on the feature point, thereby allowing analysis of the image data.

Figure 5:
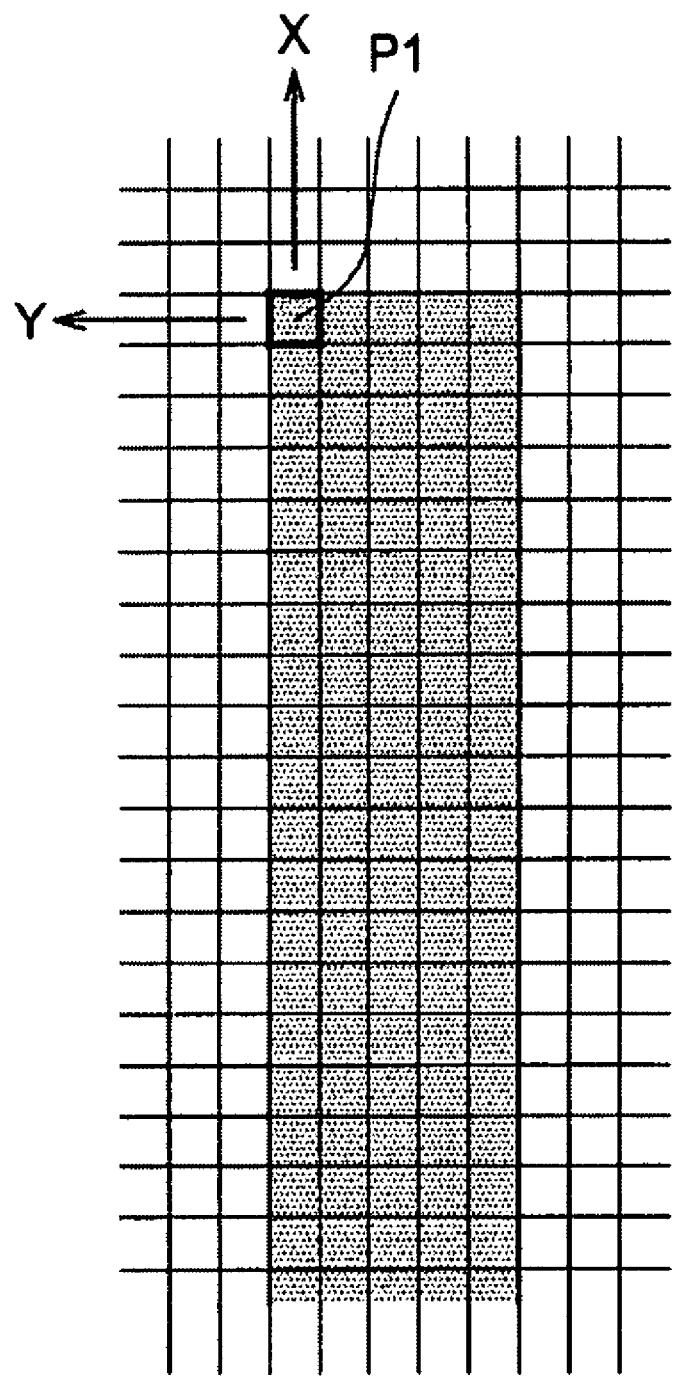
FIG. 5 is an expanded schematic diagram of a pixel that is set with a feature point P1.

Referring to FIG. 4, a plurality of feature points P1, P2, P3, P4, ..., Pn are selected within the image shot by the rear view camera 16 in order to analyze the movement of the shot image. FIG. 5 is a schematic diagram that shows an expanded view of the periphery of the pixel that is selected as feature point P1. As shown in FIG. 5, the selected feature point P1 is a pixel that has a brightness gradient in relation to both of the neighboring pixels in the X-direction and the Y-direction. Similarly, the other selected feature points are pixels that have a brightness gradient with respect to the neighboring pixels in the X-direction and the Y-direction. As a result, when each feature point moves in a given direction, the movement of each feature point in the X-direction and the Y-direction can be accurately detected. Moreover, each feature point is positioned at a location that is a distance of a determined size or more from the other neighboring feature points. In addition, the feature points are positioned so that the feature points are roughly evenly distributed throughout the entire area of the image within the display screen 12.

The movement, rotation, enlargement/contraction of the image is analyzed based on the movement of the feature points in the time-series. Once the movement, rotation, enlargement/contraction of the image has been analyzed, the movement of the information processing apparatus 10 in the direction orthogonal to the optical axis of the rear view camera 16 (hereinafter, simply referred to the optical axis when necessary), the rotation of the information processing apparatus 10, and the movement of the information processing apparatus 10 toward the optical axis and the like are computed based on the analysis results.

More specifically, the image processing portion 20 has a function that classifies the motion of image data into at least one of movement, rotation, or enlargement/contraction based on the analysis results for the movement of the feature points in the time-series. The data conversion portion 22 outputs different control data in accordance with the classified motions. Accordingly, the movement direction of the information processing apparatus 10 can be changed to activate a different function in the information processing apparatus 10.

Figure 6:
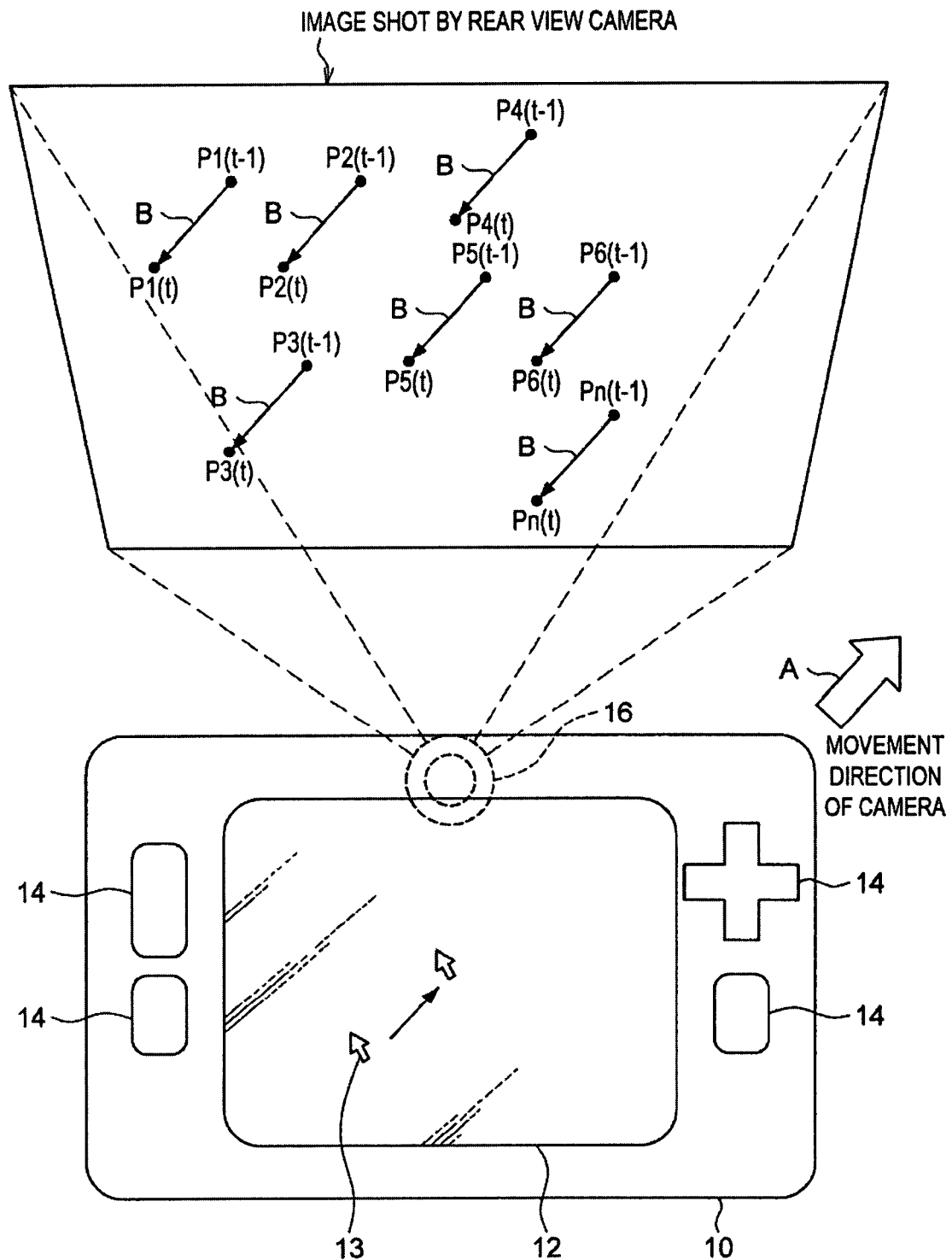
FIG. 6 is a figure that shows a method for analyzing movement of the image, and schematically shows the information processing apparatus and the image shot by the rear view camera.
Figure 7:
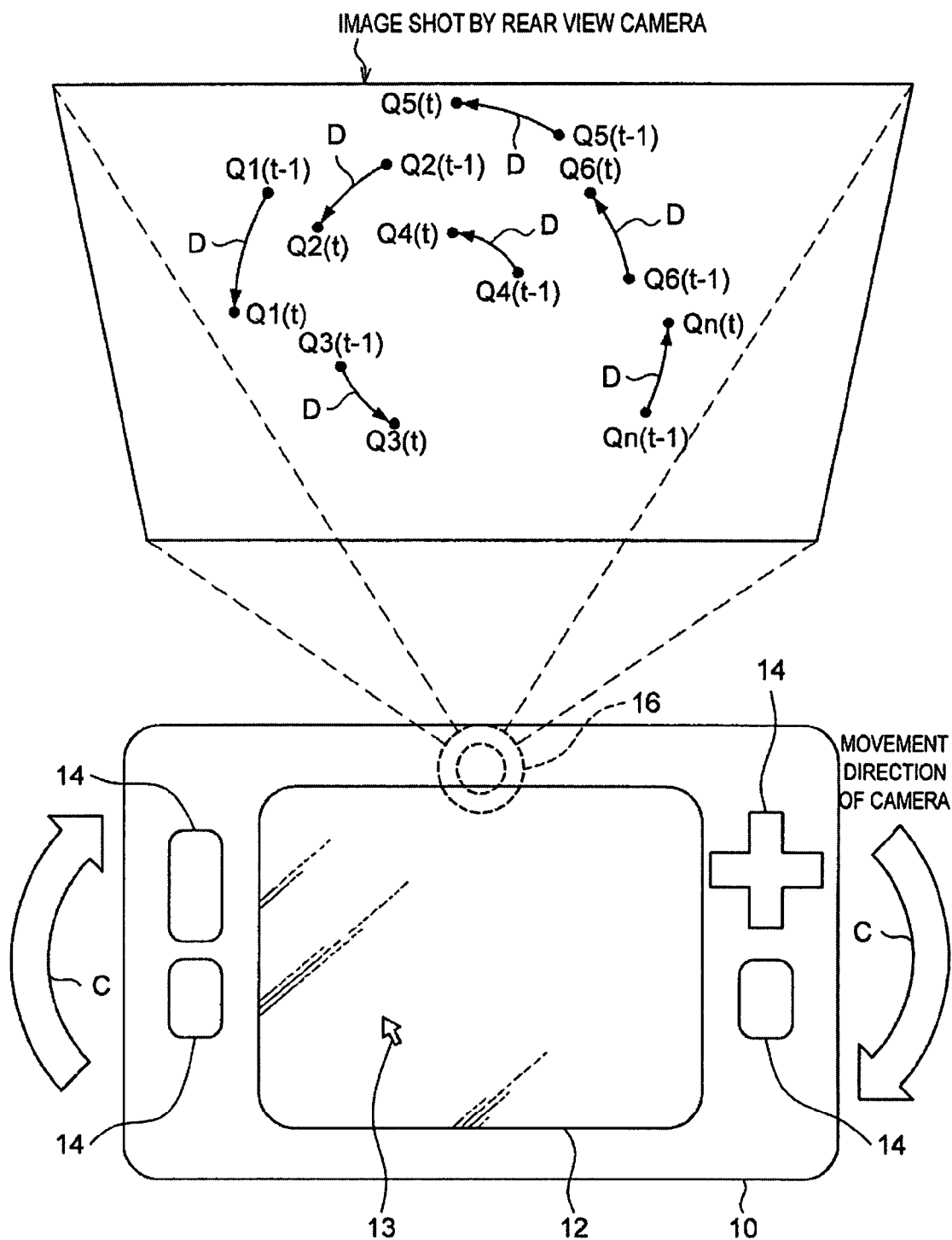
FIG. 7 is a figure that shows a method for analyzing rotation of the image, and schematically shows the information processing apparatus and the image shot by the rear view camera.
Figure 9:
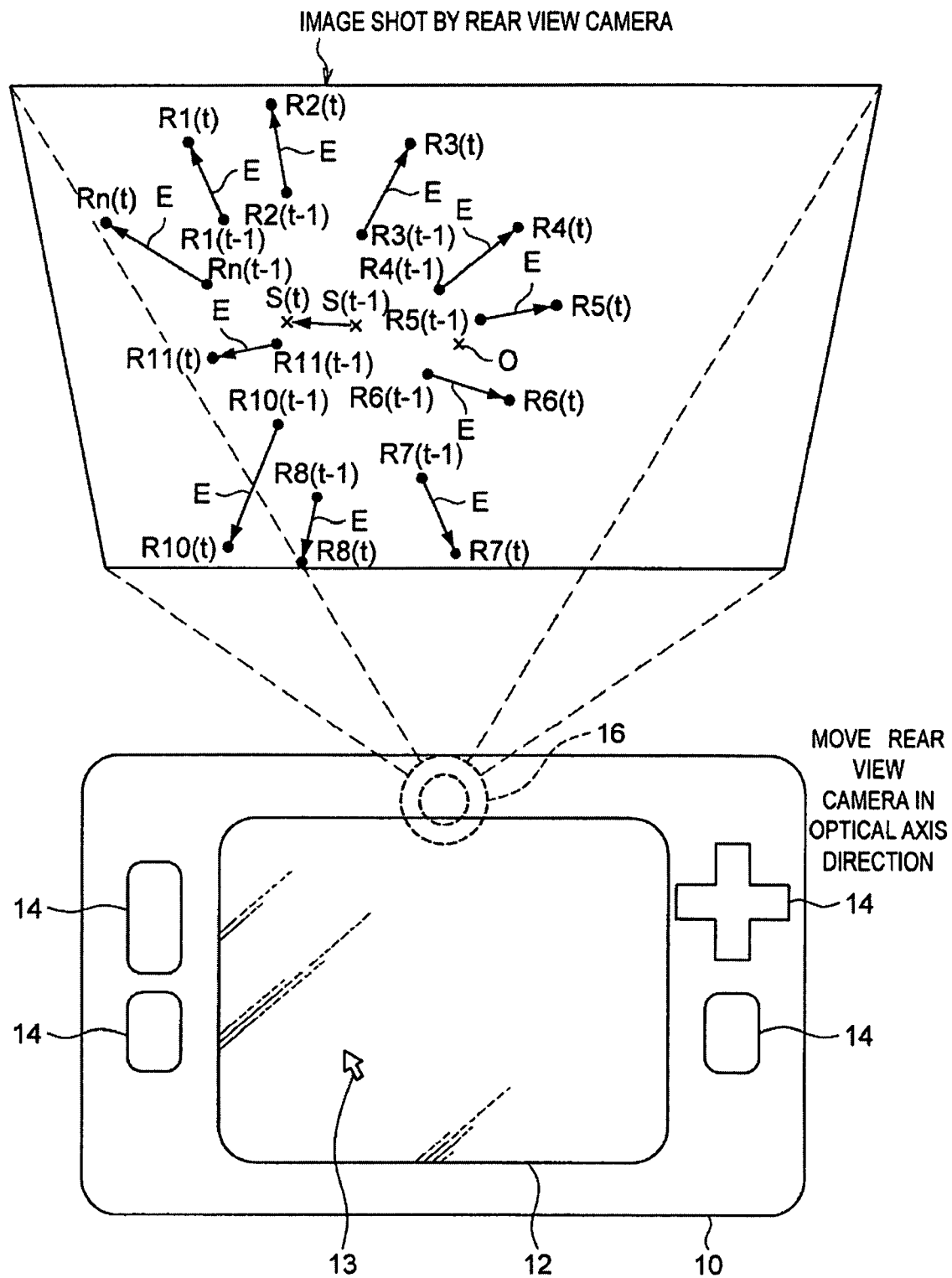
FIG. 9 is a figure that shows a method for analyzing enlargement/contraction of the image, and schematically shows the information processing apparatus and the image shot by the rear view camera.

FIGS. 6, 7 and 9 are schematic diagrams that show the method used for analyzing the movement, rotation, enlargement/contraction of the image, and shows the information processing apparatus 10 and the image shot by the rear view camera 16.

FIG. 6 shows how the selected feature points in the image move along with movement of the information processing apparatus 10 in the direction orthogonal to the optical axis. As shown in FIG. 6, when the information processing apparatus 10 is moved in the direction indicated by arrow A, the movement of the image shot by the rear view camera 16 is in the direction indicated by arrow B.

In FIG. 6, n number of feature points is selected within the image. In this case, P1 (t−1), P2 (t−1), P3 (t−1), P4 (t−1), . . . , Pn (t−1) are the positions of each feature point in the image frame for time t−1. P1 (t), P2 (t), P3 (t), P4 (t), . . . , Pn (t) are the positions of each feature point in the image frame of time t. Accordingly, a movement amount Δd of each feature point between time t−1 and time t is used as a basis for computing the movement amount of the image.

FIG. 7 shows how the selected feature points in the image rotate along with rotation of the information processing apparatus 10. In FIG. 7, Q1 (t−1), Q2 (t−1), Q3 (t−1), Q4 (t−1), . . . , Qn (t−1) are the positions of the n number of feature points in the image frame for time t−1. Q1 (t), Q2 (t), Q3 (t), Q4 (t), . . . , Qn (t) are the positions of each feature point in the image frame of time t. As can be seen, when the information processing apparatus 10 is rotated in the direction indicated by arrow C, the feature points in the image shot by the rear view camera 16 rotate in the direction indicated by arrow D.

Figure 8:
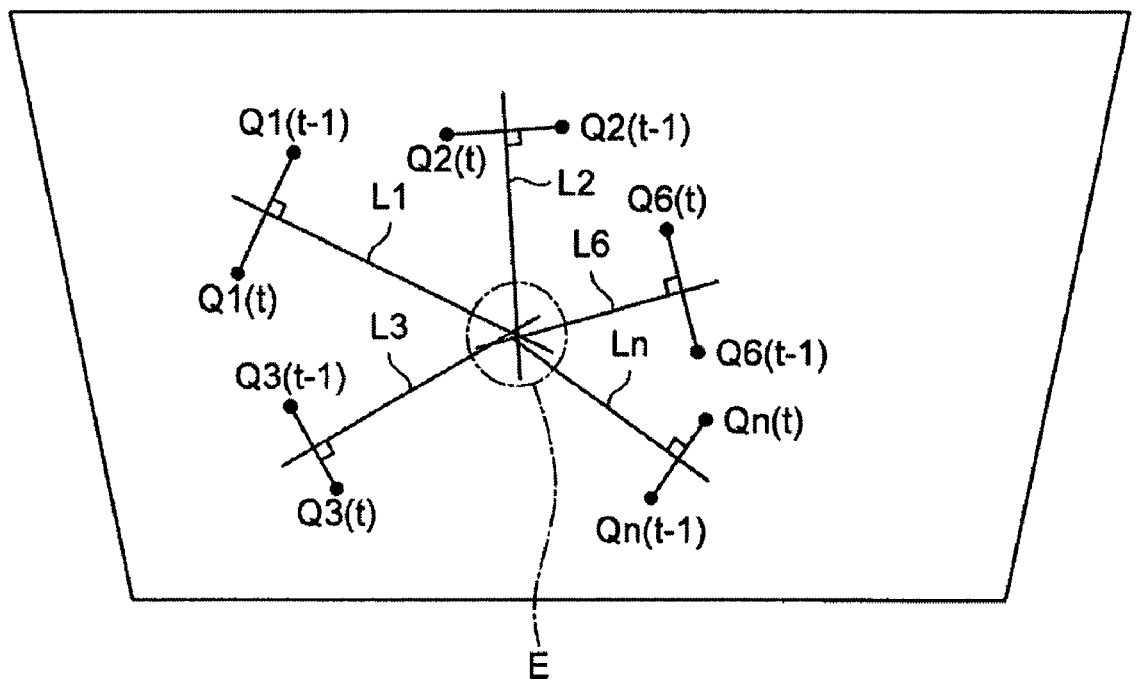
FIG. 8 is a schematic diagram that shows a method for detecting rotation of the image based on movement of the feature point as shown in FIG. 7.

FIG. 8 is a schematic diagram showing a method for detecting rotation of the image based on the movement of the feature points shown in FIG. 7. Referring to FIG. 8, straight lines connect the respective positions of each feature point for time t−1 and time t, and straight lines L1, L2, L3, . . . , Ln are set that orthogonally bisect the straight lines between the feature points. Given this, it can be determined that if the respective intersection points of the straight lines L1, L2, L3, . . . , Ln are close, a center of rotation exists. In the present embodiment, the respective intersection points of the straight lines L1, L2, L3, . . . , Ln are within a determined region E shown in FIG. 8. Thus, it can be determined that a center of rotation exists, and that the image has rotated. In this case, the mean position of the intersection points of the respective straight lines L1, L2, L3, . . . , Ln is taken as the position of the center of rotation. Note that, it is not necessarily the case that the position of the center of rotation is within the range of the shot image, and thus it may be computed that the position is outside the shot image. Once the center of rotation has been derived, a rotation amount θ is derived based on the positions of the feature points for time t−1 and time t.

FIG. 9 is a schematic diagram showing movement of the feature points selected in the image along with movement of the information processing apparatus 10 in a front-rear direction (the direction of the optical axis of the rear view camera 16). When the information processing apparatus 10 moves in the optical axis direction, the image shot by the rear view camera 16 enlarges/contracts. FIG. 9 shows an example in which the information processing apparatus 10 is moved closed to the subject object thereby causing the image to enlarge.

In FIG. 9, R1 (t−1), R2 (t−1), R3 (t−1), R4 (t−1), . . . , Rn (t−1) are the positions of n number of feature points in the image frame for time t−1. R1 (t), R2 (t), R3 (t), R4 (t), . . . , Rn (t) are the positions of feature points in the image frame for time t. In addition, S (t−1) is the mean position of the n number of feature points in the image frame for time t−1, and S (t) is the mean position of the n number of feature points in the image frame for time t. In this manner, as the information processing apparatus 10 is moved along the optical axis direction and closer to the object, the distribution of the positions of the feature points in the image becomes more dispersed. Moreover, the mean positions of the feature points move away from a center 0 of the image. Note that, the fact that the feature points are spreading out is indicated by the length of the distance from the mean positions of the feature points to each feature point.

Thus, as a result of analyzing the movements of the feature points that change in the time-series, it is possible to determine that, when the distribution of the positions of the feature points becomes more dispersed and the mean positions of the feature points move away from the center 0 of the image, the information processing apparatus 10 has been moved along the optical axis direction and toward the subject object. Conversely, it is possible to determine that, when the distribution of the positions of the feature points becomes less dispersed and the mean positions of the feature points move closer to the center 0 of the image, the information processing apparatus 10 has been moved along the optical axis direction and away from the subject object. Moreover, the movement amount in the optical axis direction of the information processing apparatus 10 can be computed based on a movement amount of each feature point, a change amount of the distribution and specification factors like the focal length of the imaging optical system.

As described above, the analysis of the movement of the feature points is performed by comparing images that change in a time-series using, for example, LK method that is one example of an optical flow computation method. FIG. 10 is a schematic diagram that shows a method for analyzing the movement of the feature points using the LK method. In this case, an example is shown in which the movement of a feature point P toward in the direction orthogonal to the optical axis is analyzed using the LK method.

Figure 10A:
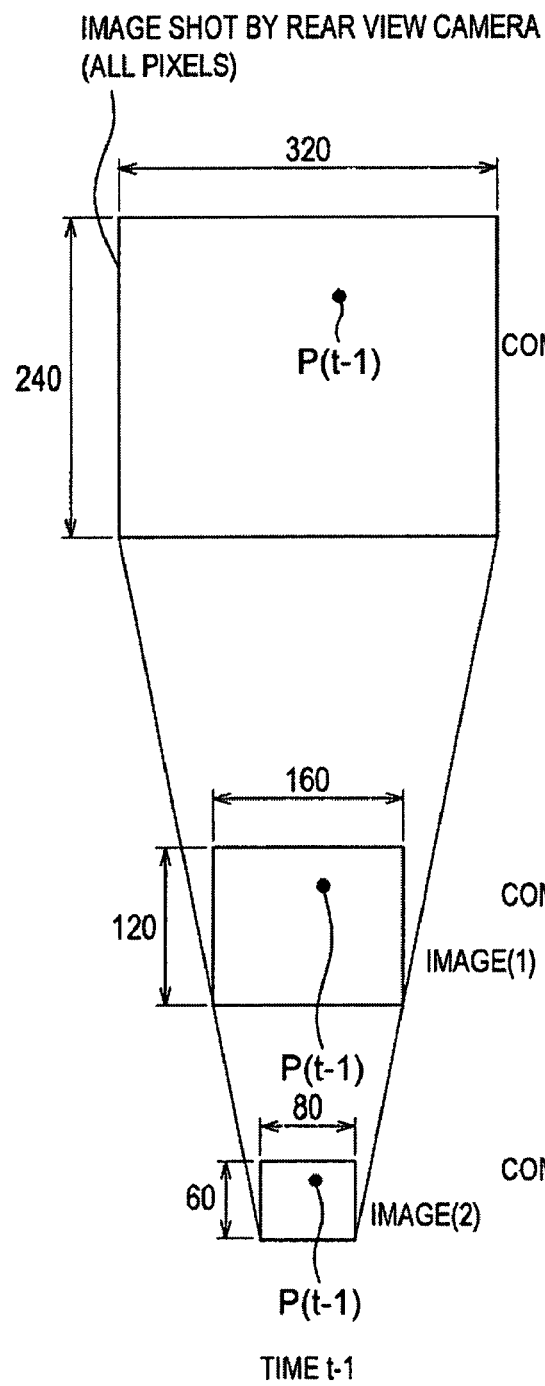
FIGS. 10A and 10B are schematic diagrams showing a method for analyzing movement of the feature point using Lucas-Kanade (LK) method.
Figure 10B:
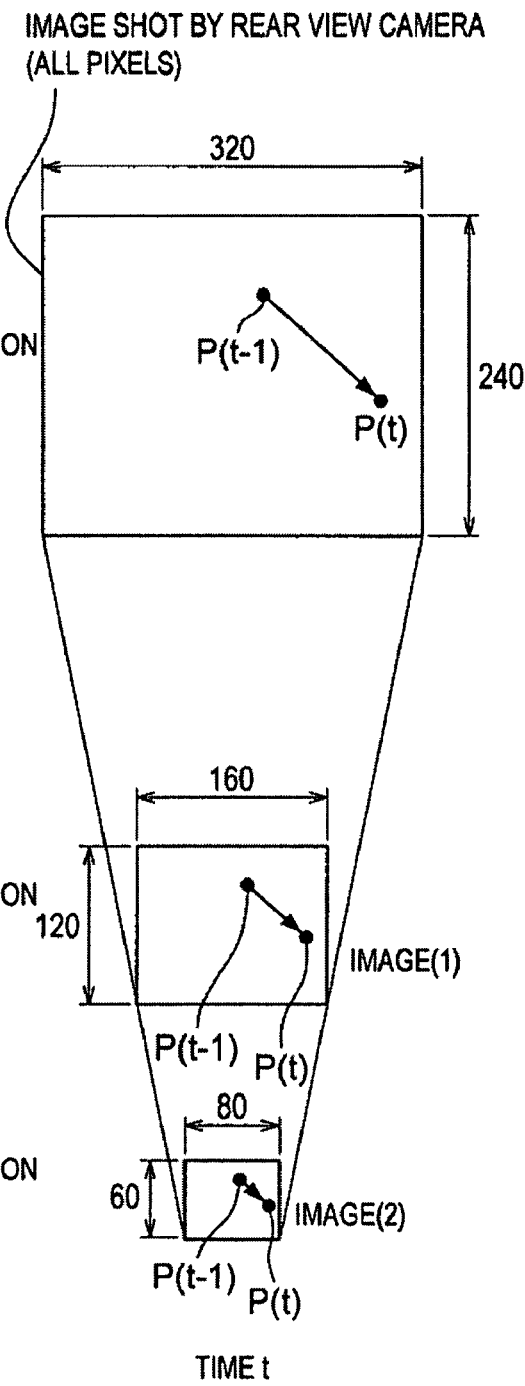

FIG. 10A shows the image frame for time t−1, and FIG. 10B shows the image frame for time t. In the optical flow processing, the movement of the feature points in the image data for time t−1 and time t is analyzed as described above. More specifically, a plurality of images that have resolutions that progressively reduce are generated from the image frame shot by the rear view camera 16, and then a pair of images that have reduced resolution are compared. Accordingly, the computation processing load for analyzing the movement of the feature point can be made as small as possible. Note that, after shooting the image data for the frames for each time, the image data is stored in the memory 26.

Referring to FIG. 10A and FIG. 10B, the pixel number of the image shot by the rear view camera 16 is set at 320×240 pixels, and based upon this two types of image are generated, namely, an image (1) with reduced resolution of 160×120 pixels, and an image (2) with further reduced resolution of 80×60 pixels. The image (1) and the image (2) are images that have the same screen size as the original image of 320×240 pixels. However, the resolution is reduced by making the pixel number smaller.

First, the images for time t−1 and time t in the image (2) with the lowest resolution are compared, and the rough movement of the feature points compared. Because the image (2) has a small pixel number and the search range is small, the processing load for analyzing the movement of the feature points using optical flow is light. As a result of analyzing the image (2), it can rapidly be determined that the feature point P (t−1) for the time t−1 has moved to the position P (t) at time t.

Next, the images for time t−1 and time t are compared focusing on the region in the image (1) where it was detected that the feature point P had moved in the image (2). Accordingly, the movement of the feature point P can be analyzed in more detail. Note that, the analysis of the image (2) allows the search range to be narrowed down. As a result, the optical flow need only be detected in the required region, which means that the processing load for analyzing the movement of the feature point is light.

Next, in the 320×240 pixel image shot by the rear view camera 16, the images for time t−1 and time t are compared focusing on the region in the image (1) where it was detected that the feature point moved. Accordingly, the movement of the feature point can be analyzed in more detail. In this case as well, the analysis of the image (1) allows the search range to be narrowed down still further, and thus the processing to detect the optical flow in the 320×240 full pixel image can be performed quickly, and the movement of the feature point can be analyzed accurately.

According to the process of FIG. 10, the processing load for analyzing the movements of the feature points in each frame in the time-series can be reduced, and the movement of the images in the time-series can be analyzed while reducing time delay as far as possible. The optical flow image processing using the LK method may be performed in accordance with, for example, the method described in the paper, "Pyramidal Implementation of the Lucas Kanade Feature Tracker Description of the Algorithm; Jean-Yves Bouguet, Intel Corporation, Microprocessor Research Labs", which is posted at home page, http://robots.stanford.edu/cs223b04/algo_tracking.pdf. In this manner, the LK method may be applied for feature points that have strong features from the point of view of the optical flow computation, and the movement of the feature points may be analyzed using images that have resolution that progressively changes. Accordingly, it is possible to compute the optical flow of the feature points with high accuracy and in a short period of time.

Note that, the optical flow computation may be performed using a method other than the LK method, for example, using a method such as a known block matching method or a gradient method.

The analysis of the movement amount of the image data may be performed using a method other than optical flow, such as a method using inter-frame difference (a motion history image). In a method using inter-frame difference, the levels (brightness) of pairs of the same pixels in images for time t−1 and time t are compared, and binarized. Then, time information is attached to the binarized information, and a motion history image is generated. As a result, images that change in the time-series can be analyzed and the gradient of the motion history image can be computed, whereby the movement direction and the movement distance of the images that change can be computed. The present embodiment is not however limited to using an algorithm that allows computation of the movement amount of image data as described above, but may also adopt various other types of method.

Figure 11:
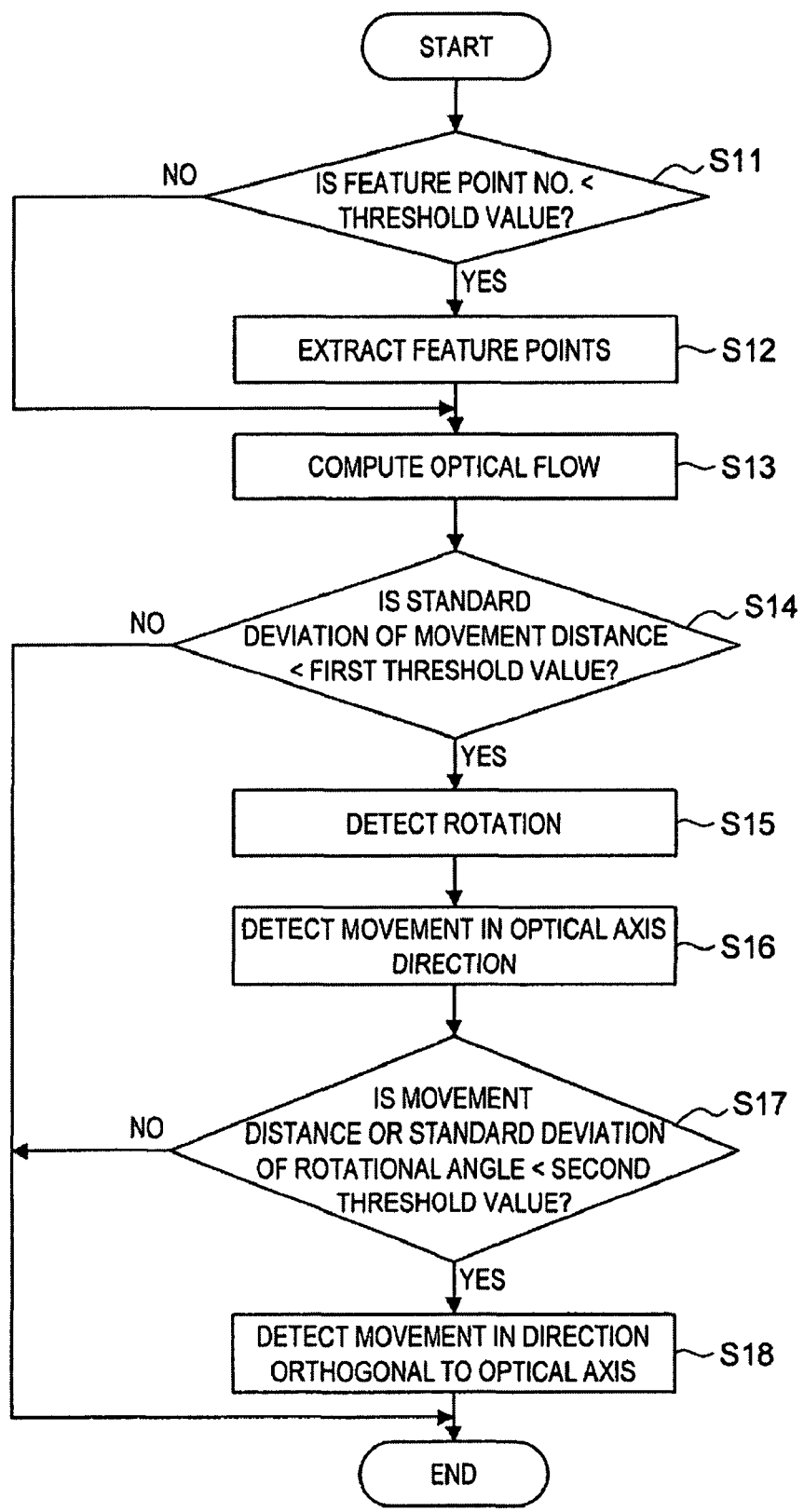
FIG. 11 is a flow chart that shows a detection process that detects movement, rotation, and enlargement/contraction of the image.

FIG. 11 is a flow chart that shows a detection process that detects movement, rotation, enlargement and contraction of an image. First, at step S11, it is determined whether the number of the feature points selected in the image shot by the rear view camera 16 is less than a determined threshold value. Then, if the number of feature points is less than the threshold value, it is determined that the number of feature points is too few, and the process proceeds to step S12, where feature points are extracted. On the other hand, if the number of feature points is equal to or above the threshold value, the process proceeds to step S13.

In the above description, pixels that are positioned where there is a brightness gradient are selected for the feature points. However, if the image shot by the rear view camera 16 changes, the number of feature points will also change along with the change of the image. In the case that number of the feature points reduces as a result of the image shot by the rear view camera 16 changing, and the number of feature points becomes less than the determined threshold value, step S12 is performed in which feature points are extracted in order to increase the number of feature points to equal to be or more than the threshold value.

At step S13, the optical flow is computed. Here, the optical flow is computed using the LK method for each feature point, and then the movement direction/movement distance of each feature point in an image coordinate system is derived. In the case that a configuration is used in which the optical flow is computed using a method other than the LK method, the optical flow is computed by the other method at step S13.

Next, at step S14, it is determined whether the standard deviation of the movement distance for each feature point derived using the optical flow computation is less than a first threshold value. If the standard deviation is less than the first threshold value, the process continues and proceeds to step S15. On the other hand, if the standard deviation exceeds the first threshold value, there is substantial variation in the movement distance of each feature point. Thus, it can be determined that, for example, there is an object, creature etc. that moves in the image shot by the rear view camera 16. In this case, the process ends since the image data is not a suitable subject for movement distance detection.

At step S15, rotation detection is performed. Here, it is assumed that each feature point performs circular motion, and respective straight lines on which the center point may exist are derived. In the case that the respective straight lines intersect at roughly one point (for example, intersect in the region E in FIG. 8), then it can be determined that the information processing apparatus 10 has been rotated around an axis that is parallel with the optical axis. Thus, a rotational angle and a rotational direction can be derived.

Next, at step S16, the expansion/contraction of the image, namely, movement of the information processing apparatus 10 in the optical axis direction, is detected. Here, if there is monotone increase in the distribution of the positions of the feature points in the image coordinate system between a certain number of frames or more such that the mean position of the feature points moves away from the center position of the image, it is determined that the information processing apparatus 10 has moved along the optical axis in the direction toward the subject object. On the other hand, if there is monotone decrease in the distribution of the positions of the feature points between the certain number of frames or more such that the mean position of the feature points moves closer to the center position of the image, it is determined that the information processing apparatus 10 has moved along the optical axis in the direction away from the subject object.

Next, at step S17, it is determined whether the movement distance of the feature points or the standard deviation of the rotational angle is less than a second threshold value. If the movement distance or the standard deviation of the angle is less than the second threshold value, the process proceeds to step S18.

At step S18, movement in the direction orthogonal to the optical axis is detected. Here, the movement direction and the movement distance of feature points that have a movement distance or a rotational angle that falls within a constant multiple of the standard deviation are computed. Then, the mean movement vector of the feature points is derived, and the opposite vector is taken as the movement vector of the information processing apparatus 10. Based on this, the movement direction and distance of the information processing apparatus 10 can be derived. Following step S18, the process ends.

On the other hand, if the standard deviation of the movement distance or the rotational angle of the information processing apparatus 10 is equal to or more than the second threshold value at step S17, the movement amount of each feature point or the variation of the rotational angle is large. Thus, it can be determined that the movement amount of the information processing apparatus 10 in a given direction that is orthogonal to the optical axis is small. Then, the process ends. In this case, just the rotation around the optical axis (step S15) or the movement in the optical axis direction (step S16) is detected.

According to the method of FIG. 11, in addition to analyzing the movement of the feature points using optical flow, the type of movement of the feature points is determined, and the movement is classified as being movement, rotation, expansion/contraction. Accordingly, the result of the classification of the movement of the image can be used as a basis for classifying the movement of the information processing apparatus 10 as movement in the direction orthogonal to the optical axis, rotation, or movement in the optical axis direction. Then, the classified movements can be used as a basis for controlling the information processing apparatus 10 to perform different functions.

Figure 12:
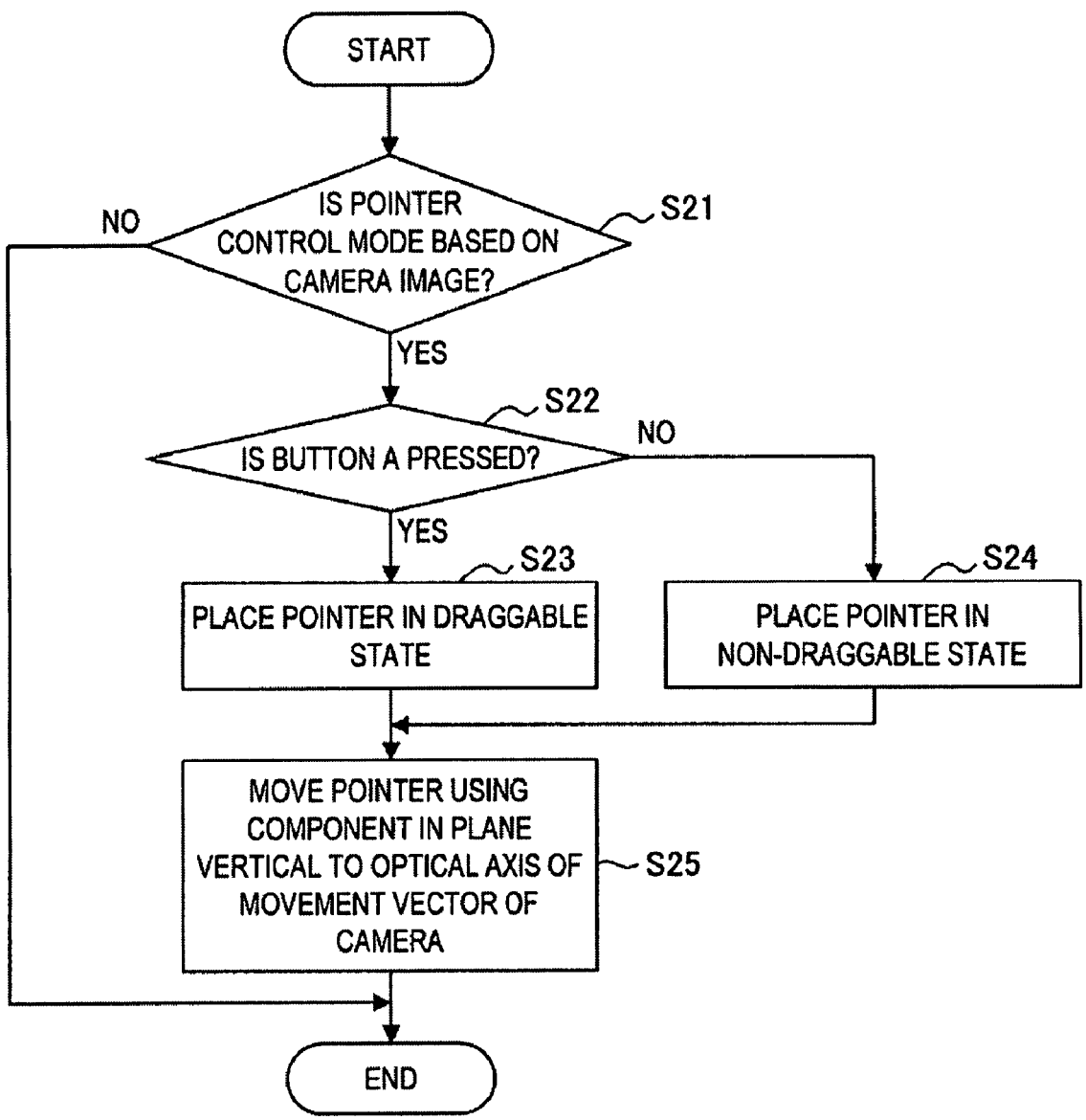
FIG. 12 is a flow chart that shows a movement process that moves a pointer.

In the present embodiment, when the movement, rotation, expansion and contraction of the image is detected by the method of FIG. 11, the detection result is used as a basis for moving the pointer 13 displayed on the display screen 12. FIG. 12 is a flow chart showing a movement process that moves the pointer 13. First, at step S21, it is determined whether a pointer control mode based on the camera image has been set in the information processing apparatus 10. The pointer control mode based on the camera image is set by, for example, pressing down one of the various buttons 14 provided on the information processing apparatus 10. Note that, if the pointer control mode based on the camera image is not set, the buttons 14 are operated to move the pointer 13.

Next, at step S22, it is determined whether one of the buttons 14 provided on the information processing apparatus 10 (hereinafter referred to as button A) that performs the drag and drop function is pressed down.

If the button A is pressed down, the process proceeds to step S23, where the pointer 13 is set such that dragging is activated. On the other hand, if button A is not pressed, the process proceeds to step S24, where the pointer is set such that dragging is deactivated. Following step S23, S24, the process proceeds to step S25.

At step S25, the component on the plane vertical to the optical axis of the movement vector of the rear view camera 16 is used to move the pointer 13. More specifically, the movement amount and movement direction of the information processing apparatus 10 derived at step S18 of FIG. 11 are used as a basis for moving the pointer 13. In particular, control data computed from the movement amount and movement direction of the information processing apparatus 10 are used as a basis for performing movement control of the pointer 13.

At this time, if dragging activated is set at step S23, the target object, namely, the icon or screen etc. beneath the pointer 13, is moved while picked up. On the other hand, if dragging deactivated is set at step S24, just the pointer 13 is moved without the target object being picked up. Then, following step S25, the process ends.

According to the first embodiment described above, the pointer 13 can be moved in the display screen 12 in accordance with the movement of the information processing apparatus 10. Accordingly, the pointer 13 can be moved easily and extremely rapidly to a desired position without having to perform troublesome operations. In addition, it is possible for processes such as analysis of the movement of the image, conversion to control data, and control of functions using the control data (e.g., movement of the pointer 13) to be performed using software. As a result, there is no need to provide members like a sensor for detecting movement, and thus the apparatus has a simple structure.

Second Embodiment

Next, a second embodiment of the present invention will be explained. The information processing apparatus 10 according to the second embodiment has the same structure as that of the first embodiment. Also, in the second embodiment, the analysis of the movement of the image shot by the rear view camera 16 is the same as that performed in the first embodiment. However, in the second embodiment, the window of the display screen 12 is scrolled based on the analysis result of the movement of the image shot by the rear view camera 16 FIG. 13 is a schematic diagram that shows a state where the information processing apparatus 10 is moved to scroll the screen when a home page browser, a photograph, a map, or a web page etc. are displayed on the display screen 12.

Figure 13E:
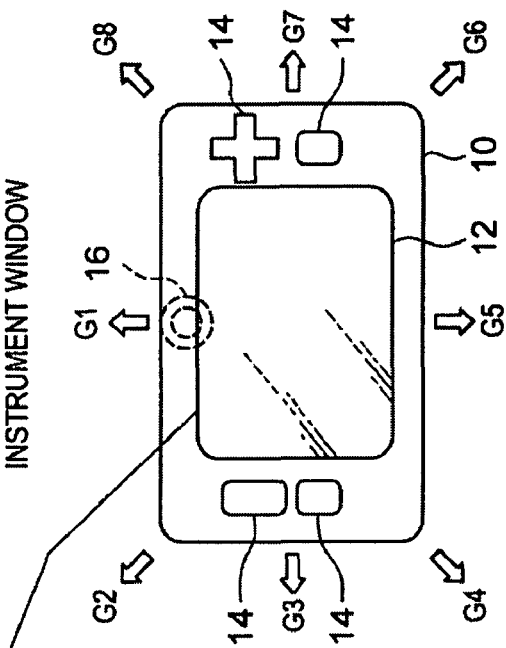
FIGS. 13A, 13B, 13C, 13D, and 13E are schematic diagrams that shows a state when the information processing apparatus is moved to scroll the screen when a home page browser, a photograph, a map, or a web page etc. are displayed on the display screen.
Figure 13B:
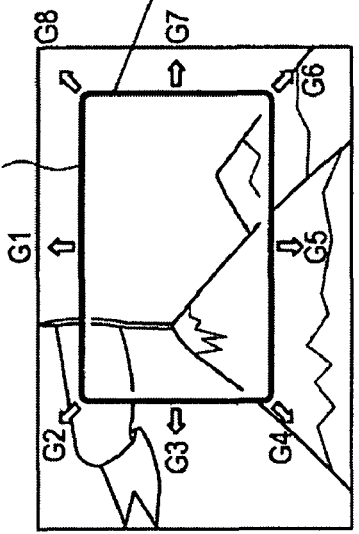
Figure 13D:
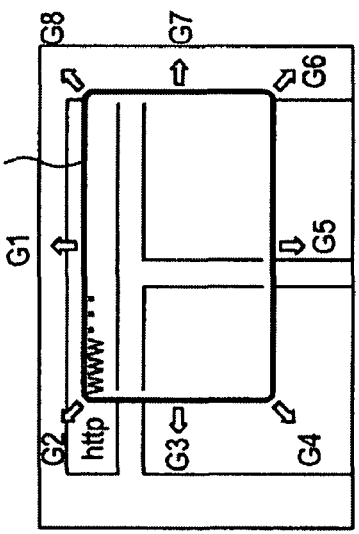
Figure 13A:
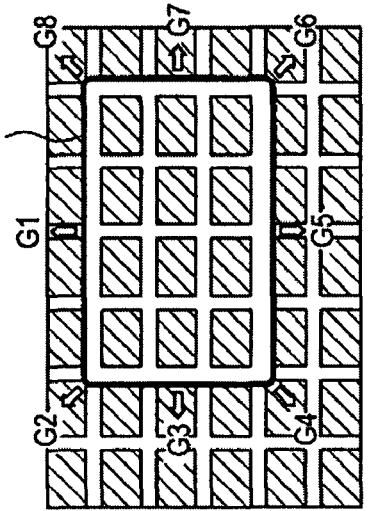
Figure 13C:
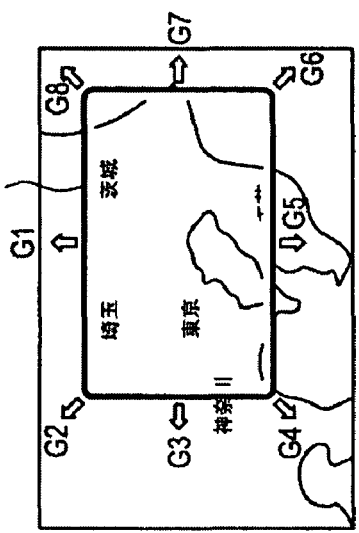

In FIGS. 13A to 13D, the display screen 12 corresponds to a region F that is shown by a frame. The image within the area inside the region F is displayed on the display screen 12. In FIG. 13A, a group of photographs are displayed, and in FIG. 13B one section of a photograph is displayed. In FIG. 13C, the area around Tokyo in a map of the Kanto region of Japan is displayed, and in FIG. 13D, a section of a web page is displayed.

FIG. 13E shows the movement direction of the information processing apparatus 10. When the information processing apparatus 10 is moved in each one of the directions indicated by the arrows G1 to G8 shown in FIG. 13E, the window displayed on the display screen 12 (in the region F) scrolls in the direction opposite to the movement direction of the information processing apparatus 10. For example, if the information processing apparatus 10 is moved in the direction of arrow G1 shown in FIG. 13E, the region F that shows the display area of the display screen 12 moves in the direction of arrow G1 in the respective FIGS. 13A to 13D, whereby the window displayed in the display screen 12 is scrolled in the direction opposite to the arrow G1.

If the information processing apparatus 10 is rotated, or if the information processing apparatus 10 is moved in the optical axis direction, the control is performed to change the display screen 12 in accordance with the movement of the information processing apparatus 10. For example, if the information processing apparatus 10 is rotated, the display on the display screen 12 is variably changed so as to rotate. On the other hand, if the information processing apparatus 10 moves closer toward the subject object in the optical axis direction, the display of the window on the display screen 12 is variably changed so as to enlarge. Moreover, if the information processing apparatus 10 is moved away from the subject object in the optical axis direction, the window on the display screen 12 is variably changed so as to contract.

Thus, according to the present embodiment, the display area (the region F) of the display screen 12 can be moved in the direction that the user moves the information processing apparatus 10, whereby optimal scrolling can be achieved that satisfies the user's operation requirements.

In addition, in the present embodiment, if the information processing apparatus 10 is moved while a determined one of the buttons 14 that issues a browser command, among the various types of button 14 provided on the information processing apparatus 10, is pressed, a browser command is issued in accordance with the depression of the determined button 14 and the movement of the information processing apparatus 10. In this case, the window in not scrolled. Examples of the issued browser command include, for example, enlarging/contracting the contents displayed on the display screen 12, displaying the next content, displaying the content that was previously displayed or the like.

Figure 14:
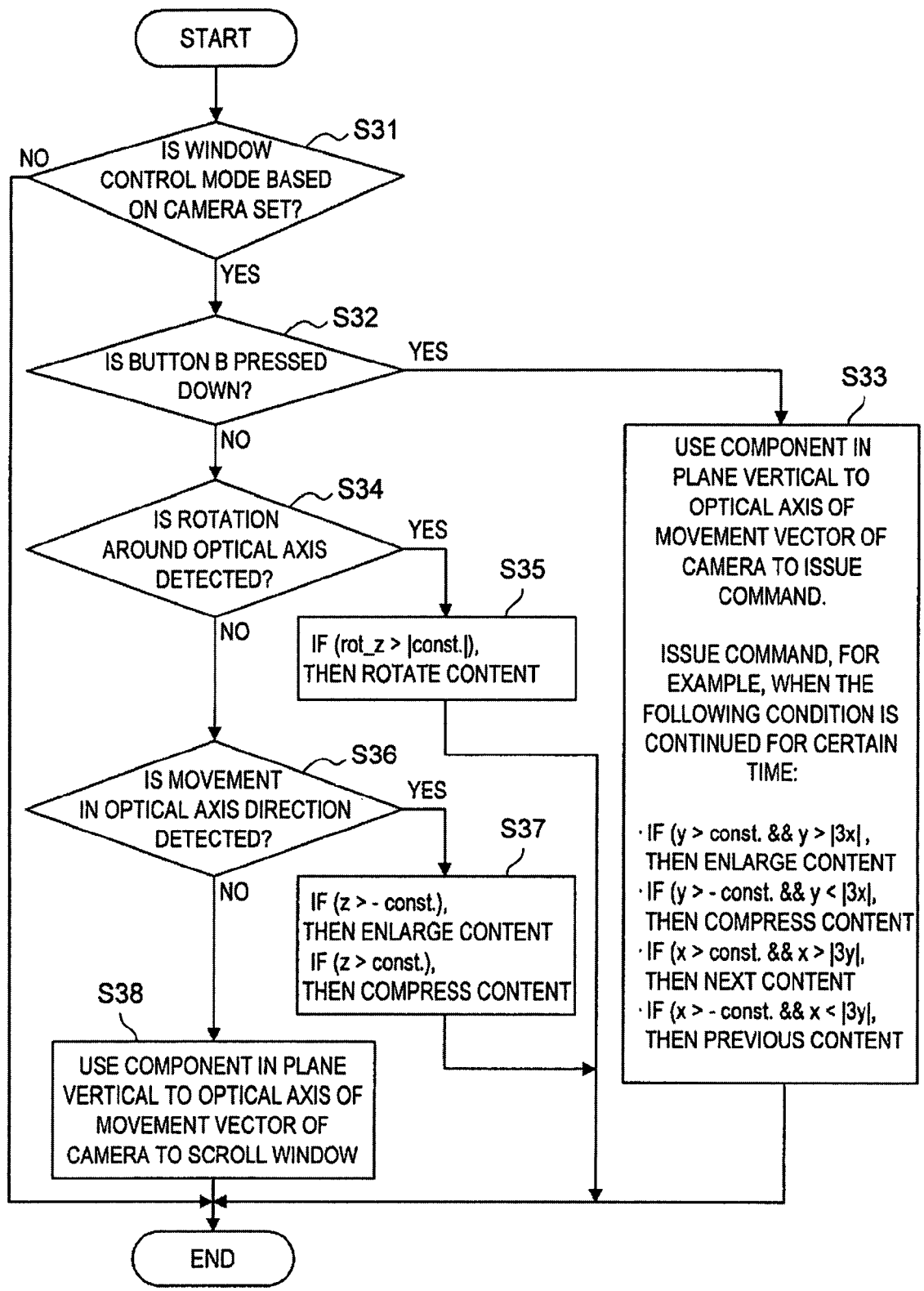
FIG. 14 is a flow chart showing a scrolling process that scrolls the display screen.

FIG. 14 is a flow chart that shows a scrolling process that scrolls the display screen 12. First, in step S31, it is determined in the information processing apparatus 10 whether a window control mode based on the camera image has been set. The window control mode based on the camera image is set by, for example, pressing down one of the various buttons 14 provided on the information processing apparatus 10. If the window control mode is set, the process proceeds to step S32. On the other hand, if the window control mode is not set, the process ends. Note that, if the window control mode based on the camera image is not set, the display screen 12 can be scrolled by operating the buttons 14.

Next, at step S32, it is determined whether the button that issues the browser command (hereinafter referred to as "button B"), among the buttons 14 provided on the information processing apparatus 10, is pressed down.

If the button B is pressed, the process proceeds to step S33. In this case, both the depression of the button B and the movement of the information processing apparatus 10 are used as a basis for issuing the browser command.

Figure 15:
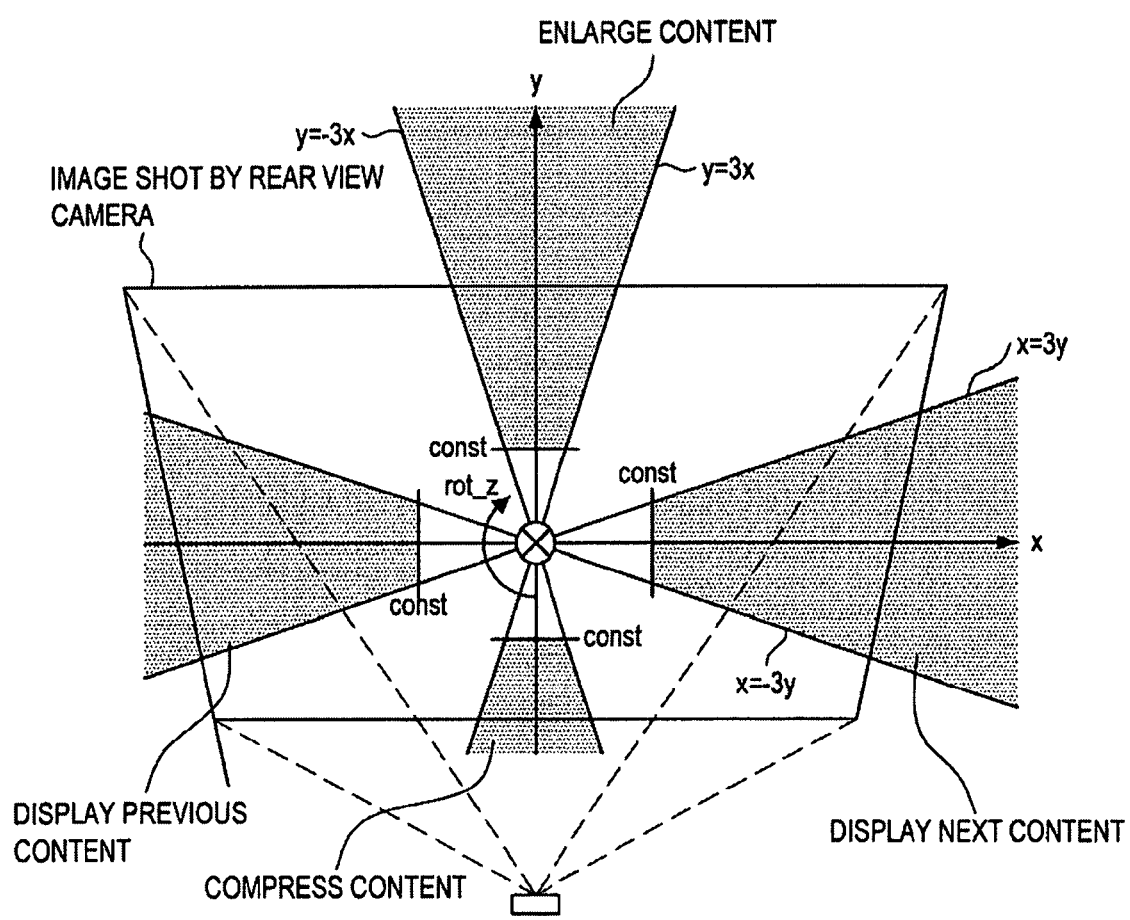
FIG. 15 is a schematic diagram that shows the relationship of the movement direction of the information processing apparatus and an issued command in the processing performed at step S33.

FIG. 15 is a schematic diagram that shows the relationship of the movement direction of the information processing apparatus 10 and an issued command in the processing performed at step S33. For example, in the processing at step S33, if the information processing apparatus 10 is moved in the range $x>0$, and the movement amount in a+y direction is greater than a determined value ($y>$const.), and the movement amount in the y direction is more than three times larger than the movement amount in an x direction ($y>|3x|$), the contents displayed on the display screen 12 are enlarged. On the other hand, if the information processing apparatus 10 is moved in the range $x<0$, and the movement amount in a−y direction is greater than a determined value $y<-$const.), and the movement amount in the y direction is less than three times larger than the movement amount in the x direction ($y<|3x|$), the contents displayed on the display screen 12 are compressed.

Furthermore, if the information processing apparatus 10 is moved in the range $y>0$, and the movement amount in a+x direction is greater than a determined value ($x>$const.), and the movement amount in the x direction is more than three times larger than the movement amount in the y direction ($x>|3y|$), the next content is displayed on the display screen 12. On the other hand, if the information processing apparatus 10 is moved in the range $y<0$, and the movement amount in a−x direction is greater than a determined value ($x<-$const.), and the movement amount in the x direction is less than three times larger than the movement amount in the y direction ($x<|3y|$), then the previous content is displayed on the display screen 12.

However, if the button B is not pressed at step S32 of FIG. 14, the process proceeds to step S34. Then, the scrolling process that scrolls the window in accordance with the movement of the information processing apparatus 10 is performed in the following processing.

More specifically, at step S34, rotation around the optical axis of the rear view camera 16 is detected using the image data. If rotation is detected at step S34, the process proceeds to step S35. At step S35, it is determined whether a rotation amount around the optical axis (z axis) exceeds a determined value (rot_z>const.). If the rotation amount exceeds the determined value, the content displayed on the display screen 12 is rotated by exactly a value that corresponds with the rotation amount. After step S35, the process ends.

If rotation is not detected at step S34, the process proceeds to step S36. At step S36, movement of the information processing apparatus 10 in the optical axis direction is detected using the image data. If movement in the optical axis direction is detected at step S36, the process proceeds to step S37.

At step S37, the content is enlarged or compressed in accordance with a movement amount in the optical axis direction of the information processing apparatus 10. For example, if the direction away from the subject object is taken to be a +direction, and the movement amount in direction Z is a negative value that is smaller than a determined value (z<−const.), the content displayed on the display screen 12 is enlarged. Alternatively, if the movement amount in direction Z is larger than the determined value (z>const.), the content displayed on the display screen 12 is compressed. Following step S37, the process ends.

On the other hand, if movement of the information processing apparatus 10 in the optical axis direction is not detected at step S36, the process proceeds to step S38. At step S38, the component in the plane vertical to the optical axis of the movement vector of the rear view camera 16 is used to scroll the window. Note that, the movement amount and movement direction of the information processing apparatus 10 derived at step S18 of FIG. 11 are used as a basis for scrolling the window. Following step S38, the process ends.

According to the second embodiment described above, the window of the display screen 12 can be scrolled in accordance with the movement of the information processing apparatus 10. Accordingly, the display screen 12 can be scrolled extremely rapidly and easily to a desired position without having to perform troublesome operations.

Third Embodiment

Next, a third embodiment of the present invention will be explained. The information processing apparatus 10 according to the third embodiment has the same structure as that of the first embodiment. Also, in the third embodiment, the analysis of the movement of the image shot by the rear view camera 16 is the same as that performed in the first embodiment. However, in the third embodiment, direct commands like starting up and shutting down of the information processing apparatus 10 are performed based on the analysis result of the movement of the image shot by the rear view camera 16.

For example, a direct command like starting up or shutting down the information processing apparatus 10 may be performed by moving the information processing apparatus 10 a determined amount or more in a determined direction. More specifically, as in the example of FIG. 15, if the information processing apparatus 10 is moved in the range x>0, and the movement amount in the +y direction is greater than a determined value (y>const.), and the movement amount in the y direction is more than three times larger than the movement amount in the x direction y>|3x|), the information processing apparatus 10 is started up. On the other hand, if the information processing apparatus 10 is moved in the range x<0, and the movement amount in the −y direction is greater than a determined value (y<−const.), and the movement amount in the y direction is less than three times larger than the movement amount in the x direction (y<|3x|), the information processing apparatus 10 is shut down.

In addition, the performance of the direct command based on detection of the movement of the information processing apparatus 10 may be performed when the buttons 14 are operated as at step S33 of FIG. 14. If this configuration is adopted, it is possible to avoid the information processing apparatus 10 being unintentionally started up/shut down when the information processing apparatus 10 is moved.

According to the third embodiment described above, direct commands like start up/shut down can be performed in accordance with the movement of the information processing apparatus 10. Accordingly, it is possible for direct commands to be performed just by moving the information processing apparatus 10 and without having to carry out troublesome operations.

Fourth Embodiment

Next, a fourth embodiment of the present invention will be explained. The information processing apparatus 10 according to the fourth embodiment has the same structure as that of the first embodiment. Also, in the fourth embodiment, the analysis of the movement of the image shot by the rear view camera 16 is the same as that performed in the first embodiment. However, in the fourth embodiment, a paint tool of the display screen 12 is controlled based on the analysis result of the movement of the image shot by the rear view camera 16.

Figure 16A:
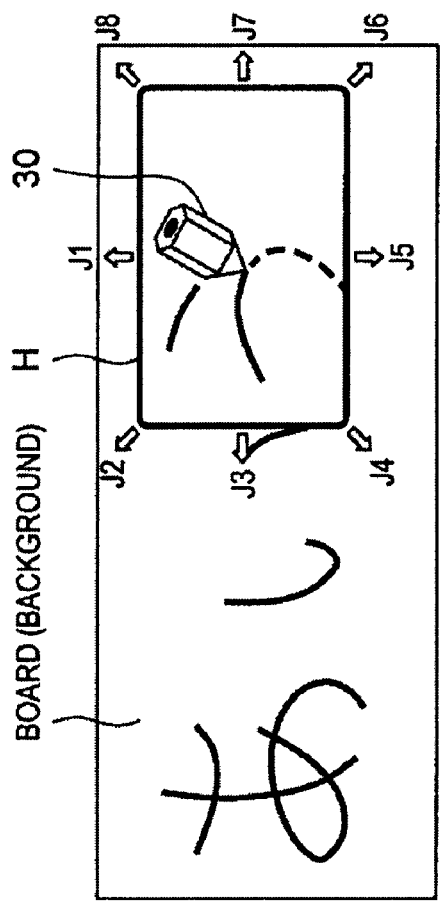
FIGS. 16A and 16B are schematic diagrams showing an example of painting that is performed on the display screen in accordance with movement of the information processing apparatus.

FIG. 16 is a schematic diagram showing an example of painting that is performed on the display screen 12 in accordance with movement of the information processing apparatus 10. FIG. 16A shows painting being performed on the image displayed on the display screen 12. In FIG. 16A, the display screen 12 corresponds to a region H surrounded by the frame. The image within the area inside the region H is displayed on the display screen 12.

When the painting function is used, a determined one of the buttons 14 is operated to set a painting tool control mode. If the painting tool control mode of the information processing apparatus 10 is set, a painting tool (pointer) 30 is displayed at a painting position on the display screen 12 as shown in FIG. 16A. Once the painting tool 30 is displayed in this manner, one of the buttons 14 that performs a painting tool function is pressed down, to activate pen input. Accordingly, paint (brush stroke) is applied to the image on the board (background) at the position of the tip end of the painting tool 30.

Figure 16B:
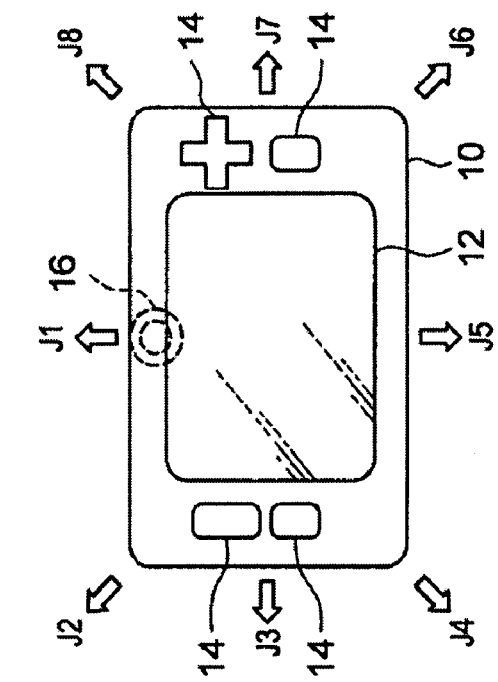

FIG. 16B shows the movement direction of the information processing apparatus 10. When the information processing apparatus 10 is moved in each one of the directions indicated by the arrows J1 to J8 shown in FIG. 16B, the board (background) in the display screen 12 (in the region H) is moved in the direction opposite to the movement direction of the information processing apparatus 10. For example, if the information processing apparatus 10 is moved in the direction of arrow J1 shown in FIG. 16B, the region H that shows the display area of the display screen 12 moves in the direction of arrow J1 in FIG. 16A, whereby the board (background) in the display screen 12 is moved in the direction opposite to the arrow J1.

The position of the pointer 30 is fixed at a determined position (for example, a central position) in the display screen 12. More specifically, the relative position of the pointer 30 with respect to the region H is fixed. On the other hand, the image on the board (background) moves within the display screen 12 in accordance with the movement of the information processing apparatus 10 as described above. Accordingly, if the information processing apparatus 10 is moved in each one of the directions J1 to J8 shown in FIG. 16B while the button 14 that performs the painting tool function is pressed down, the board (background) in the display screen 12 is moved in the movement direction, thereby applying paint to the board at the position of the tip end of the painting tool 30. As a result, if the information processing apparatus 10 is moved so as to write, for example, a character like a Japanese hiragana "a" or "i", (the sound of the letters in the Japanese alphabet shown in the figure), an "a" or "i" character can be drawn on the image on the board in the display screen 12 as shown in FIG. 16A.

Moreover, the position of the board with respect to the display screen 12 may be fixed, and the position of the painting tool 30 may be moved in accordance with the movement of the information processing apparatus 10. If this configuration is adopted, the painting tool 30 may be moved like the pointer 13 in the first embodiment so as to perform painting using the tip end of the painting tool 30.

Figure 17:
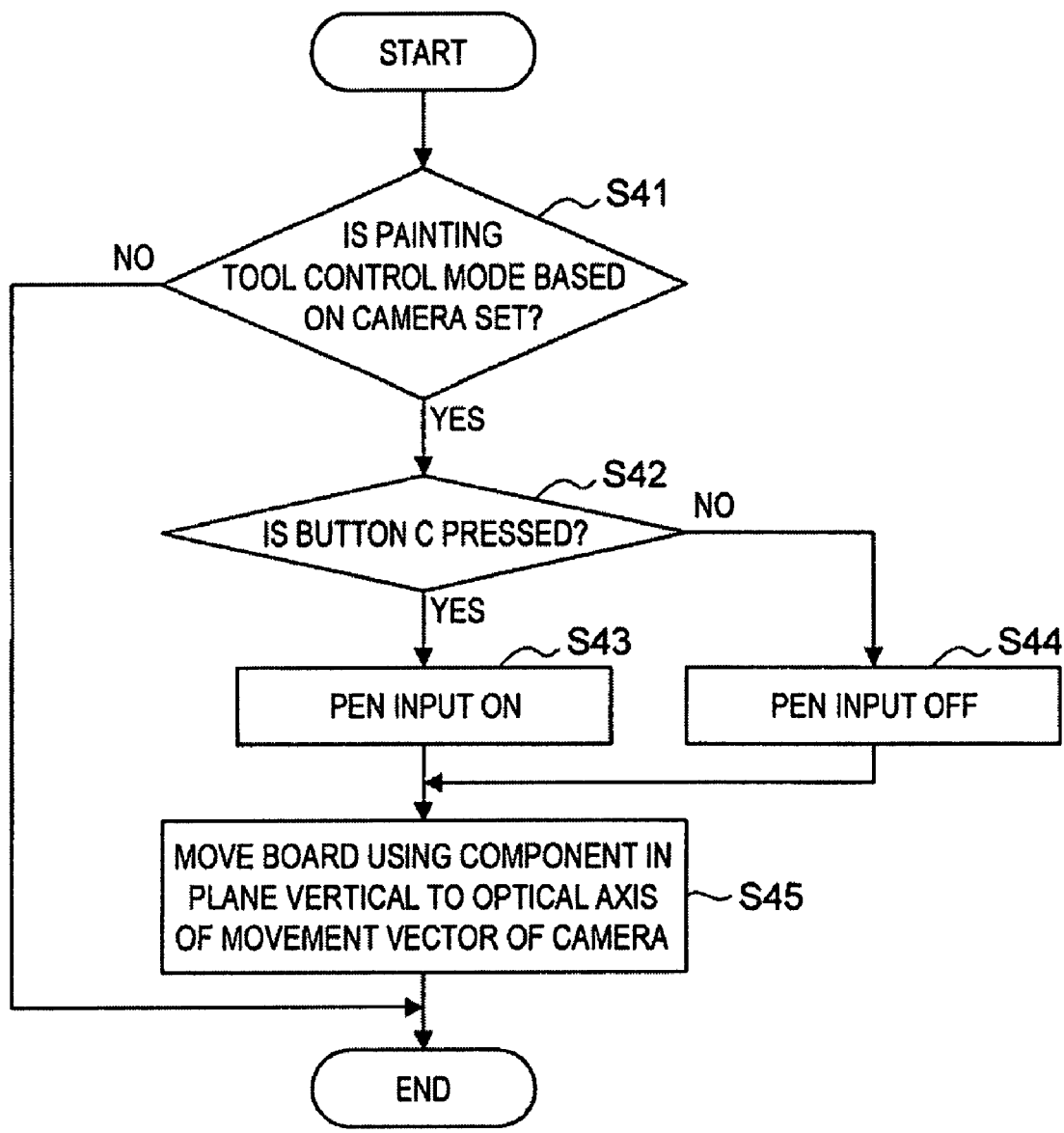
FIG. 17 is a flow chart that shows a process that is performed in a painting mode.

FIG. 17 is a flow chart that shows a process that is performed in a painting mode. First, at step S41, it is determined whether the painting tool control mode has been set in the information processing apparatus 10. If the painting tool control mode based on the camera image has been set, the process proceeds to step S42. On the other hand, if the painting tool control mode based on the camera image has not been set, the process ends. Note that, if the painting tool control mode based on the camera image has not been set, painting can be performed by operating the buttons 14.

At step S42, it is determined whether the button (hereinafter referred to as "button C") that performs the painting tool function among the buttons 14 provided on the information processing apparatus 10 is pressed down.

If the button C is pressed down, the process proceeds to step S43, where pen input is set to ON. On the other hand, if the button C is not pressed down, the process proceeds to step S44, where pen input is set to OFF.

At step S45, the component in the plane vertical to the optical axis of the movement vector of the rear view camera 16 is used to move the board (background). More specifically, the movement amount and movement direction of the information processing apparatus 10 derived at step S18 of FIG. 11 are used as a basis for moving the board. As a result, if pen input is set to ON at step S43, paint is applied at the position of the tip end of the pointer 30, whereby paint is applied to the board in accordance with the track of the painting tool 30. On the other hand, if pen input is set to OFF at step S44, painting is not performed, and just the board (background) is moved. Following step S45, the process ends.

According to the fourth embodiment described above, the application of paint to the board by the painting tool 30 can be controlled in accordance with movement of the information processing apparatus 10. Accordingly, the user can move the information processing apparatus 10 in the direction in which he/she wants to paint, thereby performing painting on the display screen 12 in a desired manner.

Fifth Embodiment

Next, a fifth embodiment of the present invention will be explained. The information processing apparatus 10 according to the fifth embodiment has the same structure as that of the first embodiment. Also, in the fifth embodiment, the analysis of the movement of the image shot by the rear view camera 16 is performed in the same manner as in the first embodiment. However, in the fifth embodiment, movement information for the information processing apparatus 10 is attached to the image shot by the rear view camera 16.

According to the method of the first embodiment, movement, rotation, enlargement/contraction of the image data can be detected based on the image shot by the rear view camera 16. In the fifth embodiment, a plurality of images are shot by the rear view camera 16 while the information processing apparatus 10 is moved, and then information indicating the movement amount, rotation amount, etc. as compared to the previously shot image is attached to the data of the successively shot images. Accordingly, the fifth embodiment allows the plurality of shot images to be positioned and synthesized at appropriate positions.

Figure 18A:
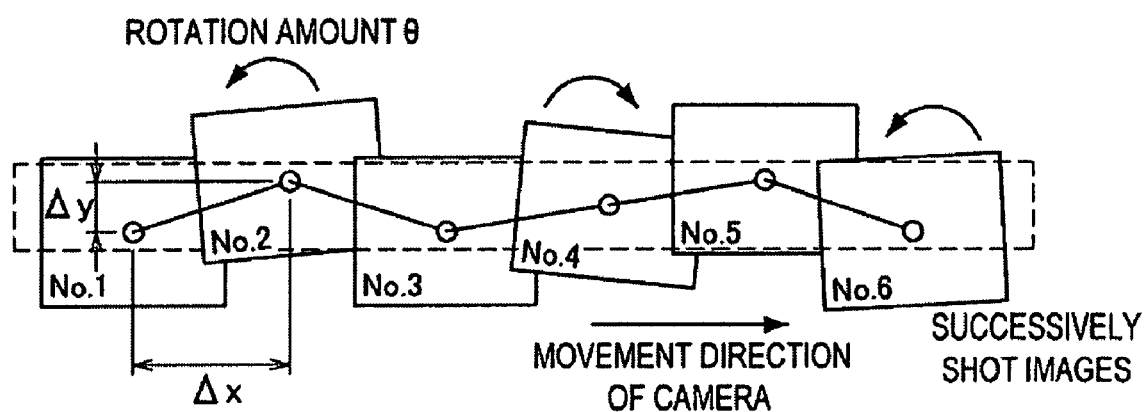
FIGS. 18A and 18B are schematic diagrams that shows a process that synthesizes a panorama image based on movement information for a camera attached to a shot image.

FIG. 18 is a schematic diagram that shows a process that synthesizes a panorama image based on movement information for the camera attached to the shot images. Note that, FIG. 18A shows an example in which six images (No. 1 to No. 6) have been successively shot while moving the rear view camera 16 in the horizontal direction.

When shooting, the movement information (a movement amount $\Delta x$, $\Delta y$, rotational amount $\theta$) for the rear view camera 16 with respect to the previously shot image is attached to each image No. 1 to No. 6. Accordingly, the movement information can be used as a basis for arranging neighboring images, whereby the view of the neighboring images is continuously joined together.

In FIG. 18A, the six images have been synthesized based on the movement information for the images of the rear view camera 16. As a result, the relative position of the neighboring shot images is aligned appropriately, and there is no deviation at the boundaries of the images. Thus, the view of each image can be continuously joined together.

Figure 18B:
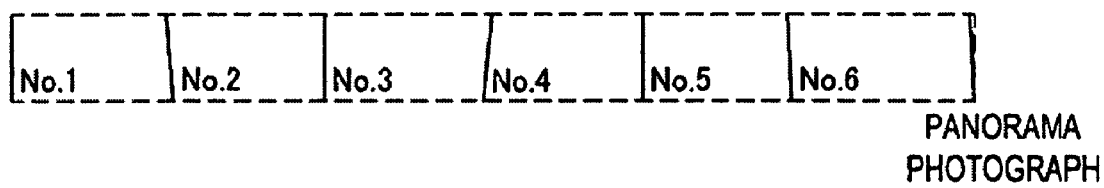

FIG. 18B shows a panorama photograph that has been created by cutting away excess top and bottom parts of each image shown in FIG. 18A. In this manner, according to the present embodiment, a plurality of images can be shot while moving the information processing apparatus 10 horizontally, and the neighboring shot images can be connected based on the movement information for the camera. Accordingly, the shot images can be arranged without any deviation between pairs of neighboring shot images, thus making it possible to easily shot images such as those used in a panorama photograph.

Next, a process that saves the image data and movement information for the rear view camera 16 will be explained using the flow chart of FIG. 19. First, at step S51, it is determined whether an attachment mode that attaches movement information for the camera to the shot photograph is set. The camera movement information attachment mode is set by operating the buttons 14.

At the following step S52, it is determined whether the shooting button of the rear view camera 16 is pressed. If the shooting button is not pressed, the process proceeds to step S53. On the other hand, if the shooting button is pressed, the process proceeds to step S54.

If the process proceeds to step S53, the movement amount and the rotation amount of the rear view camera 16 between the present time and the time when the shooting button was previously pressed are computed. On the other hand, if the process proceeds to step S54, the image shot when the shooting button was pressed at step S52 is saved. At this time, a vector that indicates the movement of the rear view camera 16 from the previous time the shooting button was pressed to when the shooting button was pressed at step S52, and a rotational component (rotational angle) are saved along with the image. Following steps S53, S54, the process ends.

Figure 19:
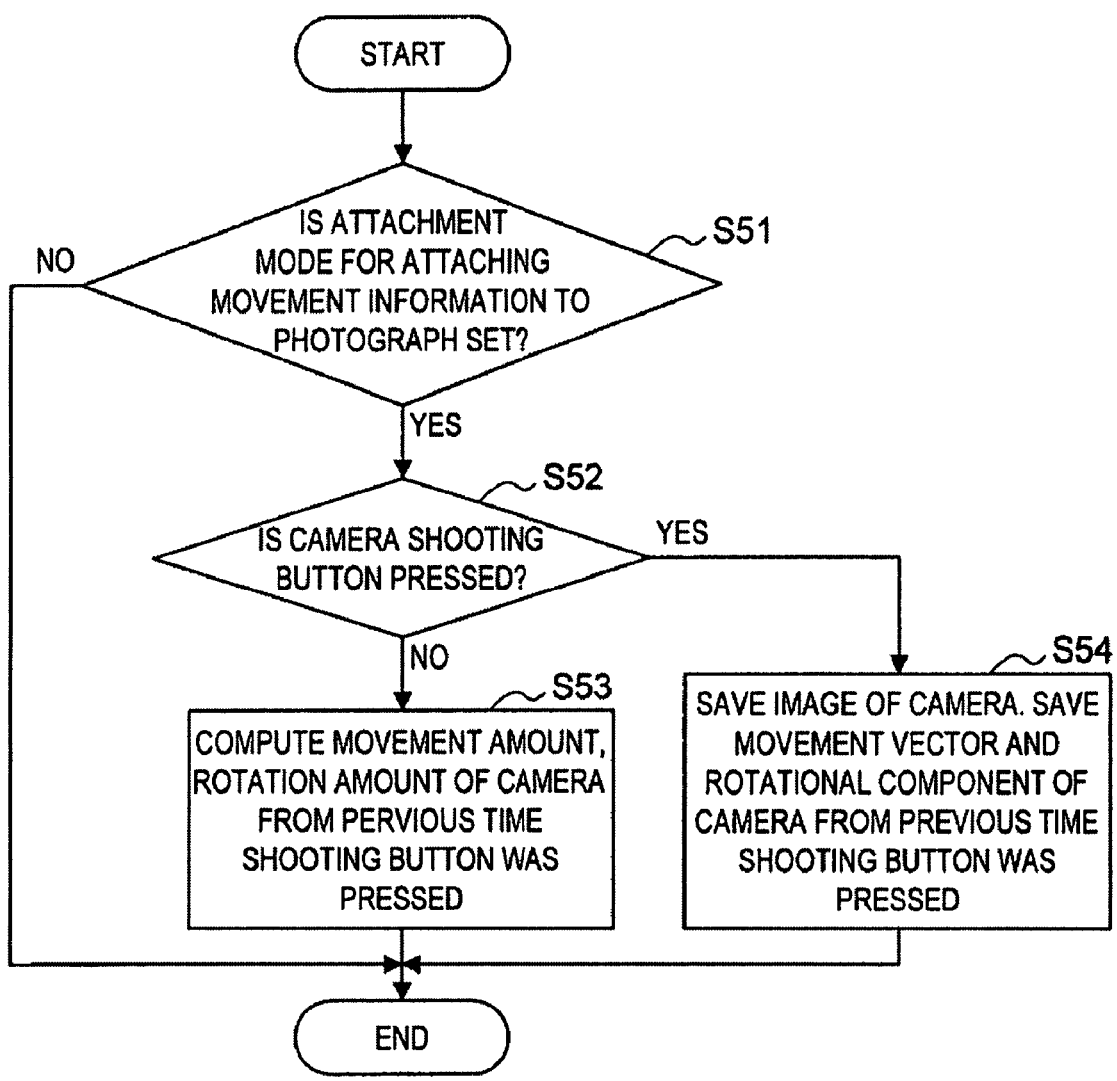
FIG. 19 is a flow chart that shows a process that saves image data and movement information of the rear view camera.

According to the process shown in FIG. 19, the image data and the movement information for the rear view camera 16 can be saved. Thus, in the case that a plurality of images are being synthesized, the movement information saved along with the image data can be used to accurately align the positions of the plurality of image data.

According to the fifth embodiment described above, when a plurality of image data is shot, the movement information for the rear view camera 16 can be attached along with the image data. As a result, if the plurality of image data is synthesized, positional alignment can be performed accurately, which makes it possible to easily synthesize a panorama photograph or the like without having to use a special piece of equipment.

Sixth Embodiment

Figure 20:
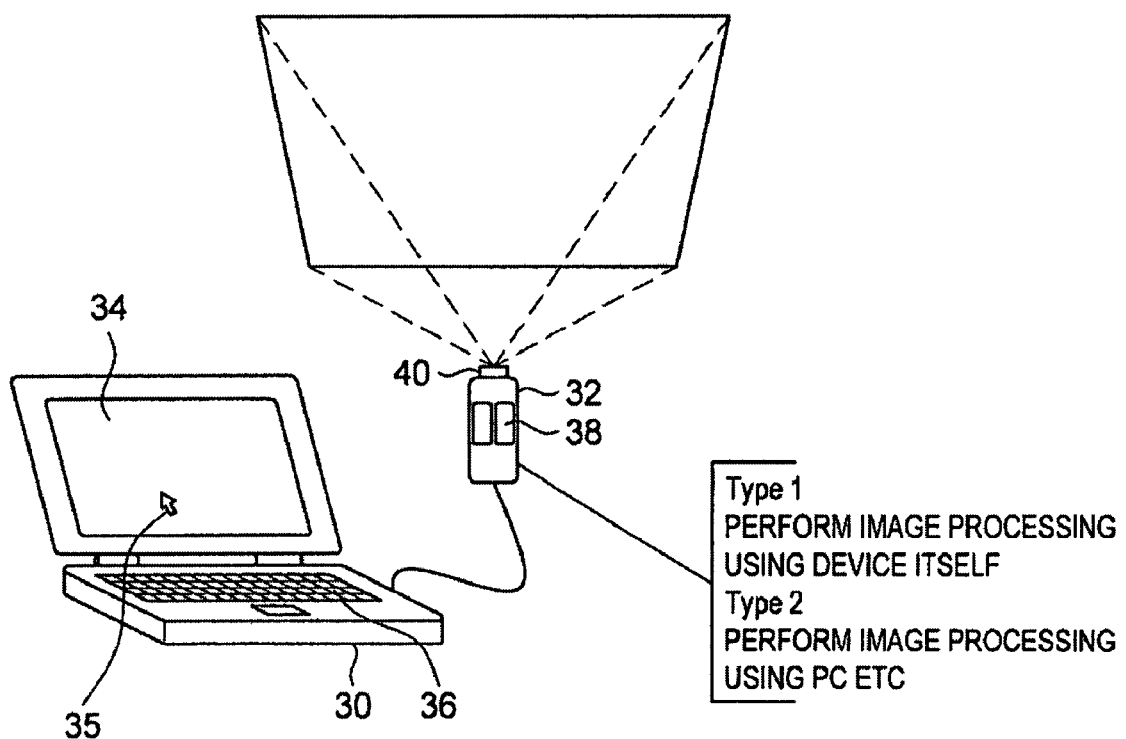
FIG. 20 is a schematic diagram that shows the external appearance of a system according to a sixth embodiment.

Next, a sixth embodiment of the present invention will be explained. FIG. 20 is a schematic diagram that shows the external appearance of a system of the sixth embodiment. Referring to FIG. 20, in the system of the sixth embodiment, a personal computer (notebook computer) 30 that is a notebook computer is connected to a mobile terminal 32. The notebook computer 30 includes a display screen 34 and a keyboard 36.

The mobile terminal 32 is a small-sized terminal provided with a camera 40, and functions as a USB mouse. The mobile terminal 32 is provided with various types of buttons 38. The camera 40 provided on the mobile terminal 32 includes an imaging optical system and an imaging element like a CCD.

In the camera 40, the image of a subject object is imaged on to the imaging element by the imaging optical system, and then data for the image is obtained using photoelectric conversion. Then, in the mobile terminal 32, movement of the mobile terminal 32 is analyzed using the same method as used in the first embodiment based on the image data. The analysis results are then sent to the notebook computer 30, and used as a basis for operating application provided in the notebook computer 30. More specifically, as in the embodiments described above, operations like moving a pointer 35 displayed on the display screen 34 of the notebook computer 30 and scrolling the window of the display screen 34 are performed in accordance with the movement of the mobile terminal 32. In addition, movement of the mobile terminal 32 may also be used as a basis for executing a browser command, operations like starting up or shutting down the notebook computer 30 using a direct command, painting using a painting tool, attaching movement information to the image data, or the like.

Thus, in the sixth embodiment, the mobile terminal 32 provided with the camera 40 can function as a device for operating the notebook computer 30. More specifically, the mobile terminal 32 may be moved in the same manner as operating a mouse to operate the notebook computer 30. Accordingly, if the display screen 34 of the notebook computer 30 is being used in a presentation, for example, in which the display screen 34 is enlarged and displayed on a wall by a projector or the like, the mobile terminal 32 can be moved to move the pointer 35 on the enlarged screen.

Figure 21:
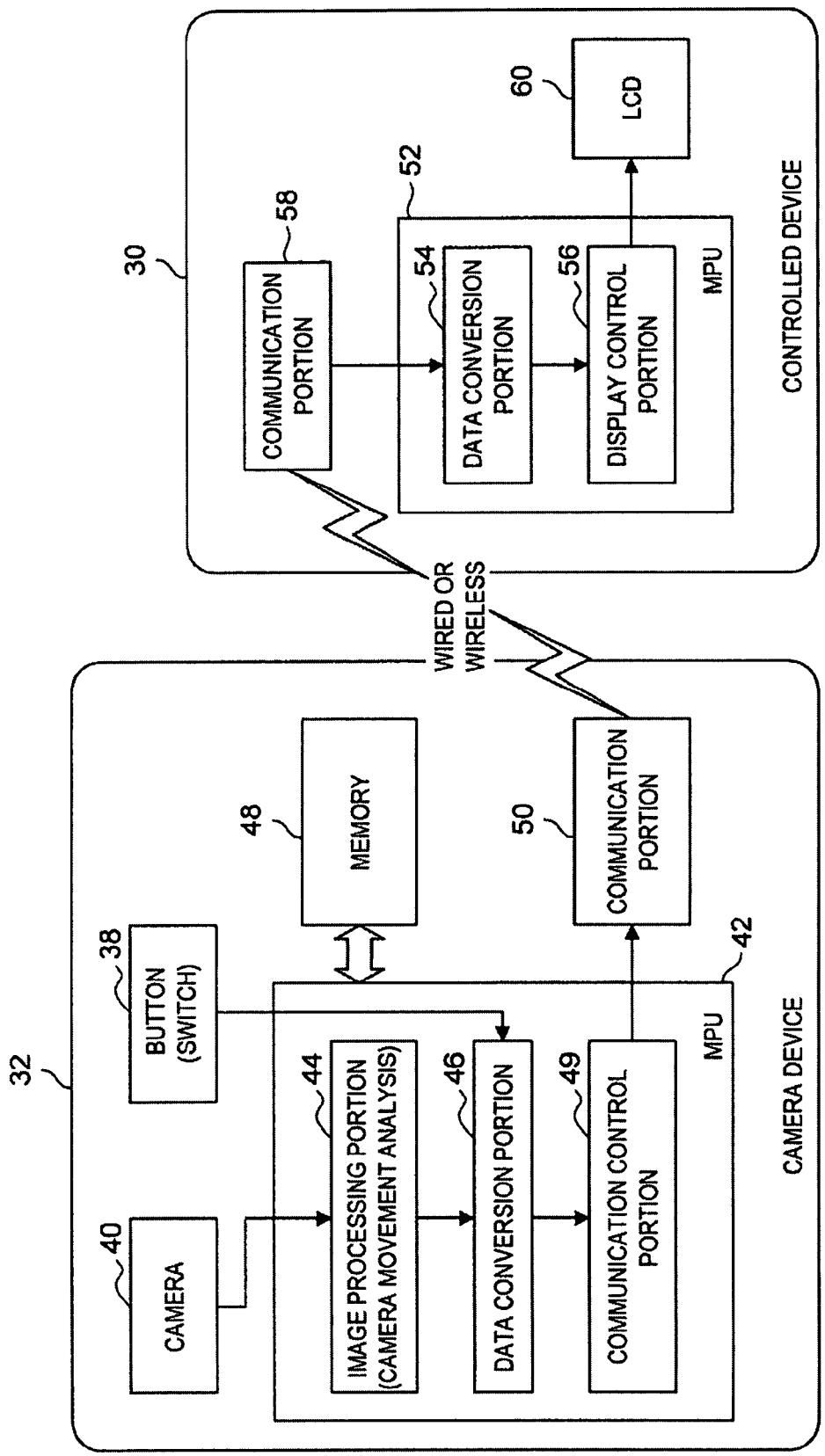
FIG. 21 is a schematic diagram showing the configuration of the system according to the sixth embodiment.

FIG. 21 is a schematic diagram that shows the structure of the system of the sixth embodiment. Referring to FIG. 21, the mobile terminal 32 includes an MPU 42. The MPU 42 includes a built-in image processing portion 44, data conversion portion 46, and communication control portion 49. The buttons 38, the camera 40, a memory 48 and a communication portion 50 are connected to the MPU 42.

In addition, the notebook computer 30 is provided with an MPU 52. The MPU 52 includes a built-in data conversion portion 54 and display control portion 56. A communication portion 58, and a liquid crystal display (LCD) 60 are connected to the MPU 52. The above-described display screen 34 is structured by the LCD 60.

In the mobile terminal 32, the image data obtained by the camera 40 is transmitted to the image processing portion 44. In the image processing portion 44, the movement of the mobile terminal 32 is analyzed based on the motion amount of the image data. The analysis of the movement of the mobile terminal 32 is performed in the same manner as in the first embodiment.

The movement of the mobile terminal 32 analyzed by the image processing portion 44 is transmitted to the data conversion portion 46. Then, information including the state of applications and the operation state of the buttons 38 (for example, if the camera 40 is provided with a zoom lens, the position of the zoom lens) are input to the data conversion portion 46.

The data conversion portion 46 converts the movement analyzed by the image processing portion 62 into control data for controlling the notebook computer 30. More specifically, the data conversion portion 46 has a function that computes a parameter for operating the notebook computer 30 in accordance with the analyzed motion of the image data (movement of the mobile terminal 32). In addition, the data conversion portion 46 outputs different control data in accordance with the state of the applications, and the operation state of the buttons 38.

The computed control data is transmitted to the notebook computer 30, thereby allowing various operations of the notebook computer 30 to be performed based on the movement of the mobile terminal 32. Note that, the various operations of the notebook computer 30 that may be performed include operations like those explained in the above-described embodiments such as moving the pointer 35 displayed on the display screen 34, scrolling the window displayed on the display screen 34, or executing direct commands such as starting up/shutting down the notebook computer 30.

The communication control portion 49 controls communication when the parameter computed by the data conversion portion 46 is transmitted to the notebook computer 30. The communication portion 50 is controlled by the communication control portion 49 and transmits the parameter computed by the data conversion portion 46 to the communication portion 58 of the notebook computer 30.

The communication portion 58 of the notebook computer 30 receives the information transmitted from the mobile terminal 32, and transmits it to the MPU 52. The data conversion portion 54 of the MPU 52 uses the information transmitted from the mobile terminal 32 as a basis for computing a movement amount and direction of the pointer 35 displayed on the display screen 34, a scroll amount and direction of the window of the display screen 34 or the like. The display control portion 56 controls the movement of the pointer 35, the scrolling of the screen or the like based on the movement amount and direction computed by the data conversion portion 54.

Thus, in the system shown in FIG. 21, image processing and movement analysis are performed at the mobile terminal 32 side, and the information related to the movement of the mobile terminal 32 is transmitted to the notebook computer 30 side. Accordingly, the notebook computer 30 can be operated in accordance with the movement of the mobile terminal 32.

Figure 22:
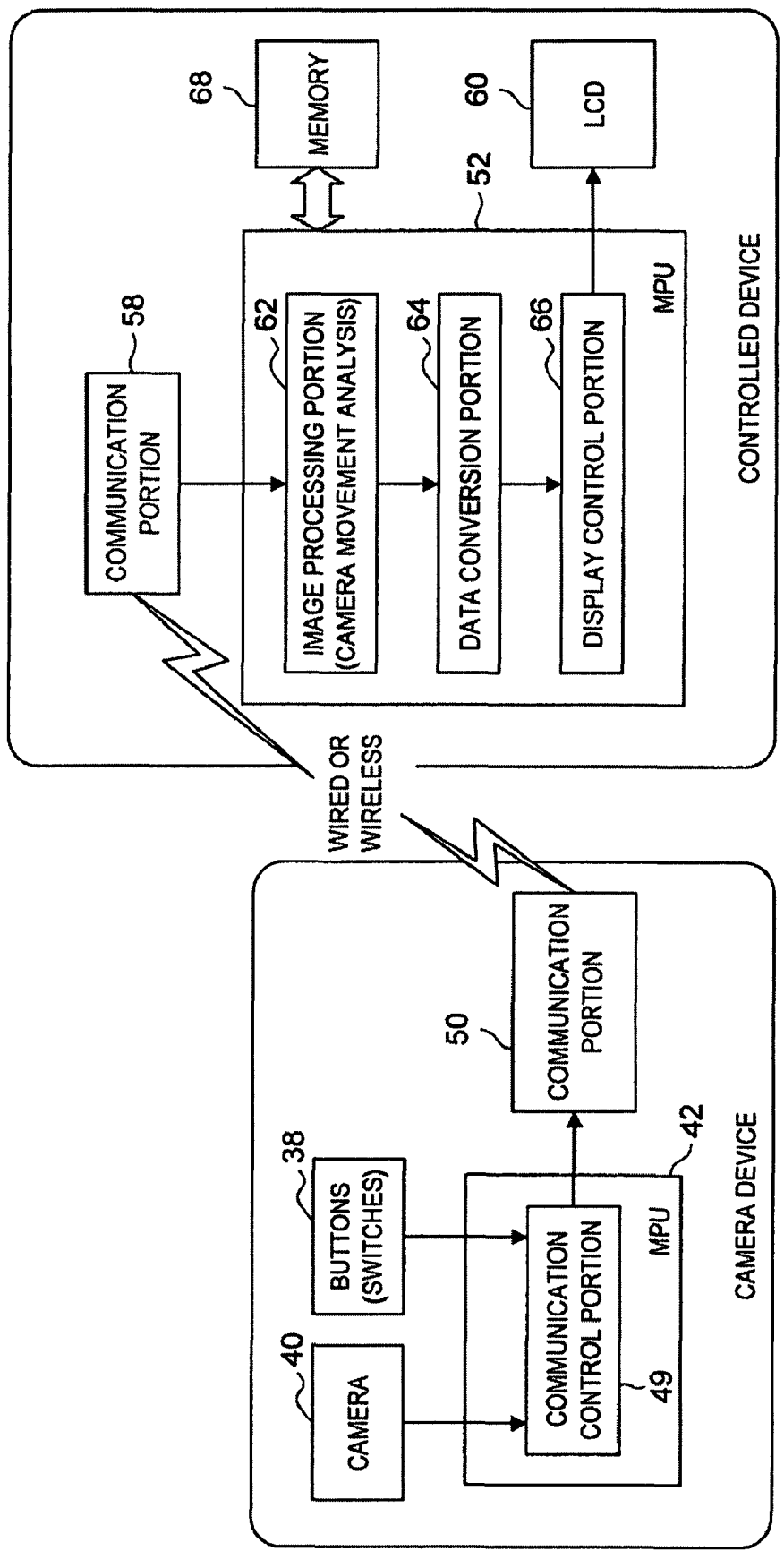
FIG. 22 is a schematic diagram that shows the configuration of another system of the sixth embodiment.

FIG. 22 is a schematic diagram that shows the structure of another system of the sixth embodiment. In the system shown in FIG. 22, the communication control portion 49 is provided inside the MPU 42 of the mobile terminal 32. However, the image processing portion 44 and the data conversion portion 46 are not provided. In addition, an image processing portion 62, a data conversion portion 64 and a display control portion 66 are provided inside the MPU 52 of the notebook computer 30. A memory 68 and the liquid crystal display (LCD) 60 are connected to the MPU 52.

In the mobile terminal 32, the image data obtained by the camera 40 is transmitted to the MPU 42. The communication control portion 49 of the MPU 42 controls the communication when the image data obtained by the camera 40 is transmitted to the notebook computer 30. The communication portion 50 is controlled by the communication control portion 49 and transmits the image data directly to the communication portion 58 of the notebook computer 30.

Thus, in the example shown in FIG. 22, the image data obtained by the camera 40 is directly transmitted to the notebook computer 30 from the communication portion 50. The communication portion 58 of the notebook computer 30 receives the image data transmitted from the mobile terminal 32, and sends it to the MPU 52. Then, the image data is stored in the memory 68. The image processing portion 62 of the MPU 52 uses the motion amount of the image data as a basis for analyzing the movement of the mobile terminal 32. The analysis of the movement of the mobile terminal 32 is performed in the same manner as in the first embodiment. Namely, the image data for the previous frame stored in the memory 68 and image data for the latest frame are used to perform analysis.

The movement of the mobile terminal 32 analyzed by the image processing portion 62 is transmitted to the display control portion 64. Then, information including the state of applications provided in the notebook computer 30, the operation state of the keyboard 36, the operation state of the buttons 38 (for example, if the camera 40 is provided with a zoom lens, the position of the zoom lens) are input to the data conversion portion 64.

The data conversion portion 64 converts the movement analyzed by the image processing portion 62 into control data for controlling the notebook computer 30. More specifically, the data conversion portion 64 has a function that computes a parameter for operating the notebook computer 30 in accordance with the analyzed motion of the image data (movement of the mobile terminal 32). In addition, the data conversion portion 64 outputs different control data in accordance with the state of the applications, the operation state of the keyboard 36, and the operation state of the buttons 38.

The computed control data is used to perform various operations of the notebook computer 30 based on the movement of the mobile terminal 32. Note that, the various operations of the notebook computer 30 that may be performed include moving the pointer 35, scrolling the window, or executing direct commands such as starting up/shutting down the notebook computer 30.

According to the system shown in FIG. 22, the analysis of the movement of the mobile terminal 32 based on the image data can be performed at the notebook computer 30 side, thereby allowing the structure of the mobile terminal 32 to be made simpler.

According to the sixth embodiment described above, the operated device like the notebook computer 30 can be operated in accordance with the movement of the mobile terminal 32 that is provided with the camera 40. Thus, a device like the notebook computer 30 can be remotely operated using a simple structure.

Seventh Embodiment

Next, a seventh embodiment of the present invention will be explained. The information processing apparatus 10 according to the seventh embodiment has the same structure as that of the first embodiment. In the seventh embodiment, a key feature, namely, the analysis of the movement of the image shot by the rear view camera 16, is the same as that performed in the first embodiment. However, in the seventh embodiment, following computation of the optical flow as in the first embodiment, an affine matrix that represents the movement or the rotation of the feature points or the enlargement/contraction is computed, and then the movement of the information processing apparatus 10 is derived based on the affine matrix.

Figure 23:
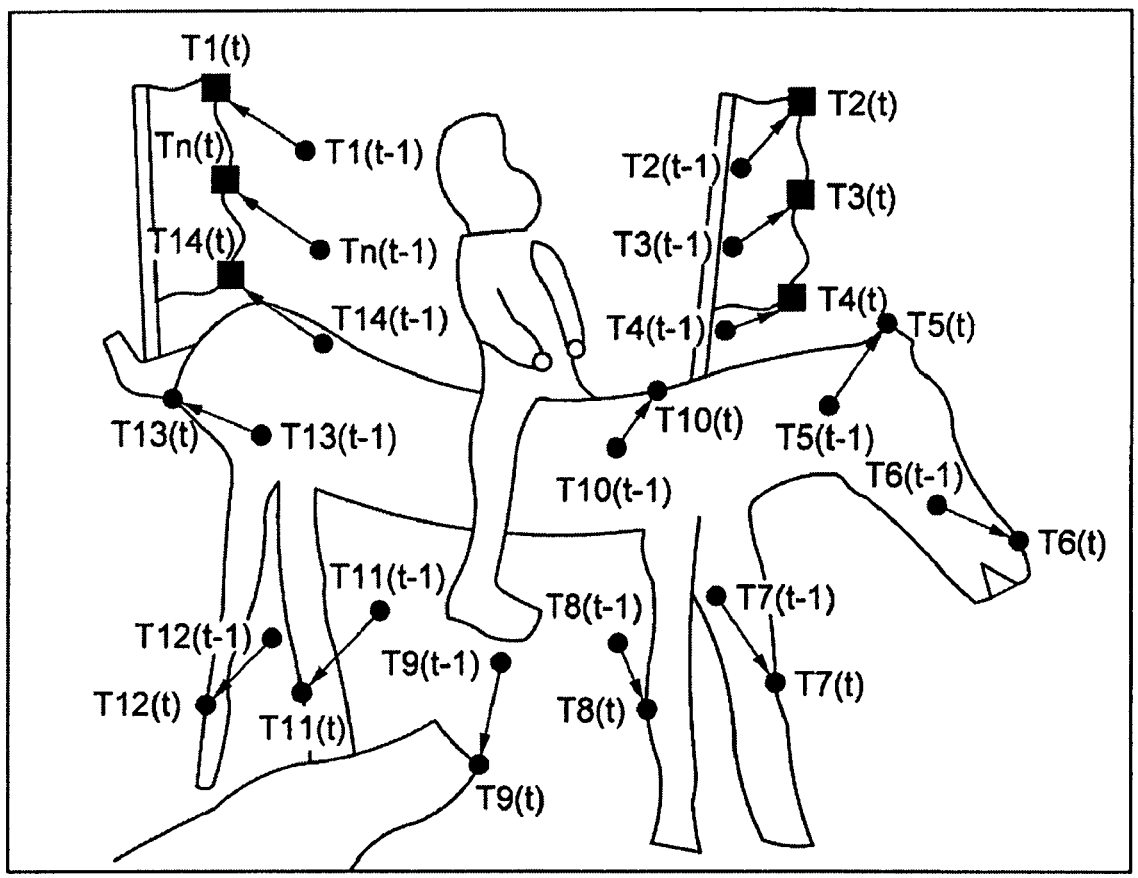
FIG. 23 is a schematic diagram showing an image that is shot by the rear view camera of the information processing apparatus, and more specifically is a schematic diagram that shows detection of the movement of the information processing apparatus using a method of a seventh embodiment.

FIG. 23 is a schematic diagram that shows the image shot by the rear view camera 16 of the information processing apparatus 10, and shows detection of the movement of the information processing apparatus 10 using a method of the seventh embodiment. FIG. 23 shows a shot scene in which the target object, namely, a wooden horse, is positioned in the center of the screen, with flags, which are fluttering due to wind, in the background.

FIG. 23 shows an example in which feature points move as in FIG. 9. More specifically, the feature points selected in the image move along with the movement in the front-rear direction of the information processing apparatus 10. In FIG. 23, T1 (t−1), T2 (t−1), T3 (t−1), T4 (t−1), . . . , Tn (t−1) are the positions of n number of feature points in the image frame for time t−1. T1 (t), T2 (t), T3 (t), T4 (t), . . . , Tn (t) are the positions of feature points in the image frame of time t. Note that, as in FIG. 9, if the information processing apparatus 10 is moved along the optical axis toward the object, the distribution of the positions of the feature points in the image becomes more dispersed.

In FIG. 23, the subject object, namely, the wooden horse, is stationary. On the other hand, the flags in the background are fluttering due to the wind, and thus the shape of the flags changes moment by moment. In this case, the movement of the feature points selected on the stationary subject object, namely, the wooden horse, accurately reflect the movement of the information processing apparatus 10. However, the movement of the feature points selected on the flags that are fluttering in the wind is a synthesis of the movement of the information processing apparatus 10 and the actual movement of the flags. Thus, if the movement of the information processing apparatus 10 is analyzed based on the above, an error corresponding to the movement of the flags is generated. As a result, in the seventh embodiment, the movement of the information processing apparatus 10 is analyzed based on the feature points on the stationary subject object that is the dominant factor reflecting the movement of the information processing apparatus 10. The movement of the other feature points is taken to be computationally irrelevant. In this manner, the affine matrix is derived that represents the movement of the information processing apparatus 10.

More specifically, three feature points are selected at random from the image, and the positions of the three feature points in the frame one before, and the positions of the three feature points in the present frame are used to derive an affine matrix that represents the relationship of the positions of the feature points in the frame one before and the positions of the feature points in the present frame. Then, three more feature points are successively selected, and affine matrixes are successively computed using the previously described method. Following this, the affine matrix among the plurality of derived affine matrixes that best reflects the movement of the information processing apparatus 10 is selected, and this selected affine matrix is used as a basis for computing the movement of the information processing apparatus 10.

The analysis of the movement using the affine matrix may be performed using a known method. For example, if the coordinates of the feature points in the present frame are taken to be (x', y'), and the coordinates of the feature points in the frame one before are taken to be (x, y), the affine transformation is represented mathematically by the following equation:

$$x'=a*x+c*y+s_x$$

$$y'=b*x+d*y+s_y$$

If the above equation is represented as a matrix, the following equation can be established. Here, A is a three row, three column affine matrix.

$$[x', y', 1]=[x, y, 1]* A$$

Here, if elements of a row i and a column j of an affine matrix A are taken to be $\alpha_{ij}$, then $\alpha_{11}=a, \alpha_{12}=b, \alpha_{13}=0, \alpha_{21}=c, \alpha_{22}=d, \alpha_{23}=0, \alpha_{31}=s_x, \alpha_{32}=s_y, \alpha_{33}=1$.

For example, if the affine matrix represents a rotation of angle θ in an anti-clockwise direction, in the affine matrix A, $s_x=s_y=0$, and thus a=cos θ, b=sin θ, c=−sin θ, and d=cos θ. Moreover, if the affine matrix represents enlargement or contraction, $b=c=0=s_x=s_y=0$, and a indicates the enlargement/contraction rate in the x-axis direction, and d indicates the enlargement/contraction rate in the y-axis direction. Furthermore, if the affine matrix represents a parallel movement, a=d=1, b=c=0, $s_x$ indicates a movement amount in the x-axis direction, and $s_y$ indicates a movement amount in the y-axis direction.

Figure 24:
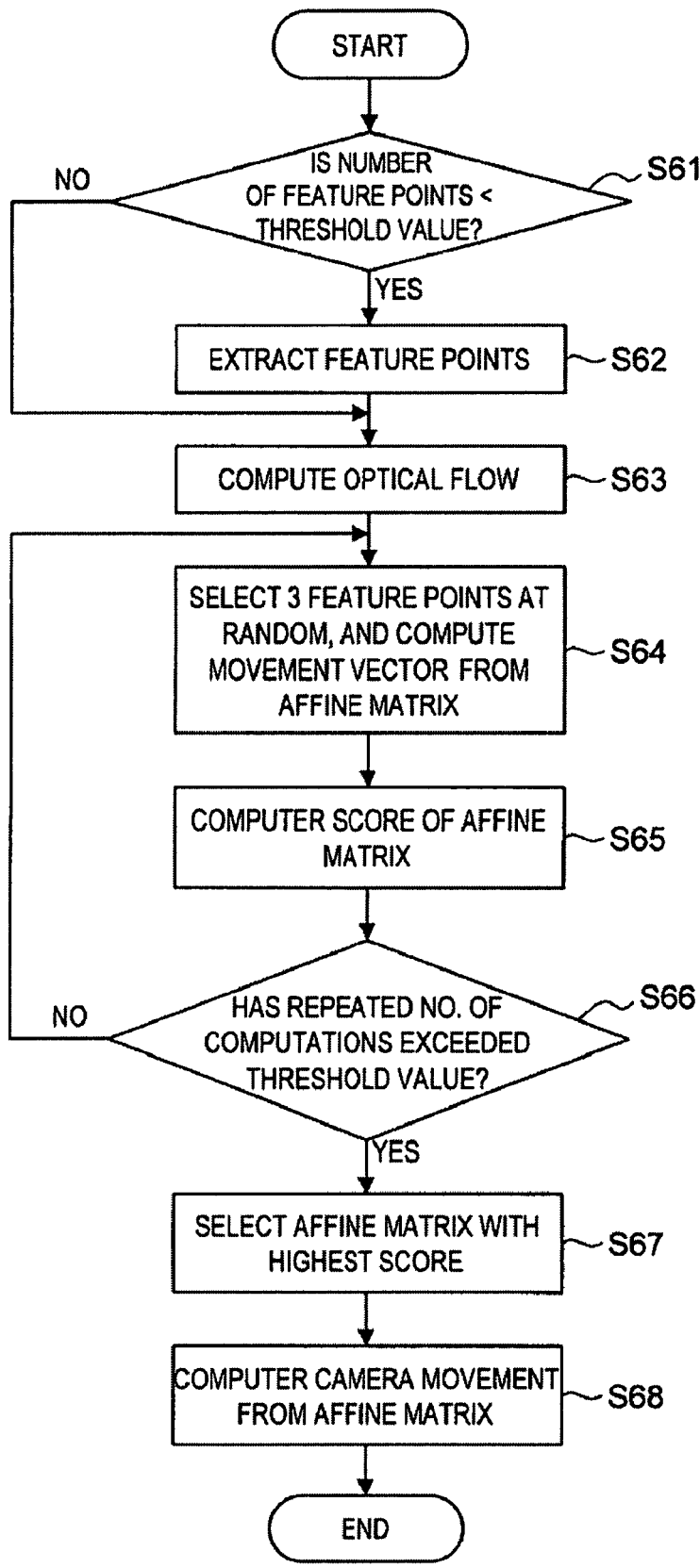
FIG. 24 is a flow chart that shows a process of the seventh embodiment.

FIG. 24 is a flow chart that shows the process of the seventh embodiment. In the flow chart of FIG. 24, the processing at steps S61 to S63 are the same as the processing at steps S11 to S13 of FIG. 11.

Following the computation of the optical flow at step S63, the three feature points are selected at random at step S64. Then, the movement vector of the three feature points is used to compute an affine matrix.

Next, at step S65, the score of the affine matrix computed at step S64 is computed. Here, the affine matrix derived at step S64 is multiplied with respect to all of the n number of the feature points in the area of the frame one before. Then, the error of the positions of the feature points obtained by multiplication of the affine matrix and the positions of the feature points in the present frame are computed for each feature point. The number of feature points that have an error smaller than a determined threshold value is taken as the score of the affine matrix.

Next, at step S66, it is determined whether the number of times that the score of the affine matrix has been computed at step S64, S65 has exceeded a determined threshold value. If the determined threshold value has been exceeded, the process proceeds to step S67. On the other hand, if the number of times that the score of the affine matrix has been computed has not exceeded the determined threshold value, the process returns to step s64, and the processing of the steps S64 to S66 is repeated.

At step S67, the affine matrix that has the highest score among the scores of the affine matrixes obtained by the processing at steps S64 to S66 is selected. Next, at step S68, the affine matrix selected at step S67 is used to compute the movement of the camera. At this time, the rotation around the optical axis, the movement in the optical axis direction and the movement in the direction orthogonal to the optical axis of the information processing apparatus 10 are computed using the affine matrix. Following step S68, the process ends.

According to FIG. 24, it is possible to obtain the affine matrix that represents the movement of each feature point most accurately from the affine matrixes that represent the movement of each feature point. Accordingly, the affine matrix can be computed based on the feature points that most dominantly reflect the movement of the information processing apparatus 10, and the movement of the other feature points is taken to be computationally irrelevant. Thus, the affine matrix that represents the movement of the information processing apparatus 10 most accurately can be computed.

According to the seventh embodiment described above, the feature points that dominantly reflect the movement can be used to accurately detect the movement of the information processing apparatus 10. Therefore, the pointer 13 etc. on the display screen 12 of the information processing apparatus 10 can be accurately controlled in accordance with the movement of the information processing apparatus 10.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a shot image obtaining portion, including an imaging element, that obtains a shot image in a time-series from the imaging element;
   an image processing portion that performs image processing on the shot image and analyzes movement of the shot image resulting from movement of the information processing apparatus;
   a data conversion portion that converts the analyzed movement of the shot image into control data; and
   a control portion that controls functions based on the control data,
   wherein the image processing portion analyzes the movement of the time-series of the shot image by setting a plurality of feature points in the shot image, and deriving a time-series of movement of the feature points using optical flow processing,
   wherein the image processing portion includes:
       an affine matrix computation portion that computes a plurality of affine matrixes that represent the relationship of positions of feature points in a present frame and positions of feature points in a frame one before using feature points selected at random, and
       an affine matrix selection portion that computes the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value,
   and wherein the movement of the shot image in the time-series is analyzed based on the affine matrix that is selected by the affine matrix selection portion.

2. The information processing apparatus according to claim 1, wherein
   the information processing portion includes a movement classification portion that classifies the movement of the shot image into at least one classification type including movement in a direction orthogonal to an optical axis of an optical system that images a target object on the imaging element, rotation around the optical axis, and enlargement/contraction, and the data conversion portion converts the movement of the analyzed shot image into the control data such that the control data differs depending on the classification type of the movement of the shot image.

3. The information processing apparatus according to claim 1, further comprising:

a switch that is operable by a user, wherein the data conversion portion variably changes the control data based on an operating state of the switch.

4. The information processing apparatus according to claim 1, further comprising:

a display portion that displays information, wherein the control portion controls operation of a pointer displayed on the display portion based on the control data.

5. The information processing apparatus according to claim 1, further comprising:

a display portion that displays information, wherein the control portion controls scrolling of a screen displayed on the display portion based on the control data.

6. The information processing apparatus according to claim 1, wherein the control portion executes a direct command including starting up and shutting down the information processing apparatus based on the control data.

7. An information processing apparatus comprising:

a shot image obtaining portion, including an imaging element, that obtains a shot image in a time-series from the imaging element;

an image processing portion that performs image processing on the shot image and analyzes movement of the shot image resulting from movement of the information processing apparatus;

a data conversion portion that converts the analyzed movement of the shot image into control data;

a control portion that controls functions based on the control data; and a display portion that displays information, wherein a painting tool that indicates a painting position is displayed at a determined position on the display portion, and the control portion uses the control data as a basis for moving one of the painting tool and a background screen displayed on the display portion such that paint is applied to the background screen at the position of the painting tool.

8. An information processing apparatus comprising:

a shot image obtaining portion, including an imaging element, that obtains a shot image in a time-series from the imaging element;

an image processing portion that performs image processing on the shot image and analyzes movement of the shot image resulting from movement of the information processing apparatus;

a data conversion portion that converts the analyzed movement of the shot image into control data;

a control portion that controls functions based on the control data;

a movement information attachment portion that attaches movement information to each one of a plurality of the shot images obtained in the time-series, the movement information being related to the movement of the shot images that is analyzed by the image processing portion; and an image synthesis portion that synthesizes the plurality of shot images based on the movement information related to the movement of the shot images.

9. An information processing apparatus that is connected to an imaging apparatus by one of a wired and a wireless connection, comprising:

a shot image receiving portion that receives a shot image obtained in time-series from the imaging apparatus;

an image processing portion that performs image processing on the shot image and analyzes movement of the shot image resulting from movement of the imaging apparatus;

a data conversion portion that converts the analyzed movement of the shot image into control data; and a control portion that controls functions based on the control data, wherein the image processing portion analyzes the movement of the time-series of the shot image by setting a plurality of feature points in the shot image, and deriving a time-series of movement of the feature points using optical flow processing, wherein the image processing portion includes:

an affine matrix computation portion that computes a plurality of affine matrixes that represent the relationship of positions of feature points in a present frame and positions of feature points in a frame one before using feature points selected at random, and an affine matrix selection portion that computes the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value, and wherein the movement of the shot image in the time-series is analyzed based on the affine matrix that is selected by the affine matrix selection portion.

10. The information processing apparatus according to claim 9, further comprising:

a display portion that displays information, wherein the control portion controls operation of a pointer displayed on the display portion based on the control data.

11. The information processing apparatus according to claim 9, further comprising:

a display portion that displays information, wherein the control portion controls scrolling of a screen displayed on the display portion based on the control data.

12. An imaging apparatus that is connected to an information processing apparatus by one of a wired and a wireless connection, comprising:

a shot image obtaining portion, including an imaging element, that obtains a shot image in a time-series from the imaging element;

an image processing portion that performs image processing on the shot image and analyzes movement of the shot image resulting from movement of the imaging apparatus;

a data conversion portion that converts the analyzed movement of the shot image into control data; and a transmission portion that transmits the control data to the information processing apparatus for use in controlling functions of the information processing apparatus, wherein the image processing portion analyzes the movement of the time-series of the shot image by setting a plurality of feature points in the shot image, and deriving a time-series of movement of the feature points using optical flow processing, wherein the image processing portion includes:
an affine matrix computation portion that computes a plurality of affine matrixes that represent the relationship of positions of feature points in a present frame and positions of feature points in a frame one before using feature points selected at random, and
an affine matrix selection portion that computes the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value, and wherein the movement of the shot image in the time-series is analyzed based on the affine matrix that is selected by the affine matrix selection portion.

13. An information processing system comprising an imaging apparatus and an information processing apparatus, the imaging apparatus connected to the information processing apparatus by one of a wired and a wireless connection, wherein the imaging apparatus includes
a shot image obtaining portion, including an imaging element, that obtains a shot image in a time-series from the imaging element,
an image processing portion that performs image processing on the shot image and analyzes movement of the shot image resulting from movement of the imaging apparatus,
a data conversion portion that converts the analyzed movement of the shot image into control data, and
a transmission portion that transmits the control data to the information processing apparatus for use in controlling functions of the information processing apparatus, and the information processing apparatus includes
a receiving portion that receives the control data from the imaging apparatus, and
a control portion that controls functions based on the control data, wherein the image processing portion analyzes the movement of the time-series of the shot image by setting a plurality of feature points in the shot image, and deriving a time-series of movement of the feature points using optical flow processing, wherein the image processing portion further includes:
an affine matrix computation portion that computes a plurality of affine matrixes that represent the relationship of positions of feature points in a present frame and positions of feature points in a frame one before using feature points selected at random, and
an affine matrix selection portion that computes the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value, and wherein the movement of the shot image in the time-series is analyzed based on the affine matrix that is selected by the affine matrix selection portion.

14. An information processing system comprising an imaging apparatus and an information processing apparatus, the imaging apparatus connected to the information processing apparatus by one of a wired and a wireless connection, wherein the imaging apparatus includes
a shot image obtaining portion, including an imaging element, that obtains a shot image in a time-series from the imaging element, and
a shot image transmission portion that transmits the shot image to the information processing apparatus, and the information processing apparatus includes
a shot image receiving portion that receives the shot image,
an image processing portion that performs image processing on the shot image and analyzes movement of the shot image resulting from movement of the imaging apparatus,
a data conversion portion that converts the analyzed movement of the shot image into control data, and
a control portion that controls functions based on the control data, wherein the image processing portion analyzes the movement of the time-series of the shot image by setting a plurality of feature points in the shot image, and deriving a time-series of movement of the feature points using optical flow processing, wherein the image processing portion further includes:
an affine matrix computation portion that computes a plurality of affine matrixes that represent the relationship of positions of feature points in a present frame and positions of feature points in a frame one before using feature points selected at random, and
an affine matrix selection portion that computes the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value, and wherein the movement of the shot image in the time-series is analyzed based on the affine matrix that is selected by the affine matrix selection portion.

15. An apparatus control method comprising the steps of:
obtaining a shot image in a time-series from an imaging element;
performing image processing on the shot image and analyzing movement of the shot image resulting from movement of an apparatus that shot the shot image;
converting the analyzed movement of the shot image into control data; and
controlling at least one of functions of the apparatus and functions of another apparatus connected to the apparatus based on the control data, wherein analyzing the movement of the time-series of the shot image includes setting a plurality of feature points in the shot image, and deriving a time-series of movement of the feature points using optical flow processing, wherein performing images processing further includes:
computing a plurality of affine matrixes that represent the relationship of positions of feature points in a present frame and positions of feature points in a frame one before using feature points selected at random, and computing the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value, and wherein analyzing the movement of the time-series of the shot image is based on the affine matrix that is selected by the affine matrix selection portion.

16. A non-transitory computer readable storage medium having encoded thereon a computer program comprising a set of instructions when executed by a computer to implement a method comprising instructions that command a computer to function as:

an obtaining portion that obtains a shot image in a time-series from an imaging element;

a processing-analysis portion that performs image processing on the shot image and analyzes movement of the shot image resulting from movement of an apparatus including the imaging element;

a conversion portion that converts the analyzed movement of the shot image into control data; and a control portion that controls functions based on the control data, wherein analyzing the movement of the time-series of the shot image includes setting a plurality of feature points in the shot image, and deriving a time-series of movement of the feature points using optical flow processing, wherein performing images processing further includes:

computing a plurality of affine matrixes that represent the relationship of positions of feature points in a present frame and positions of feature points in a frame one before using feature points selected at random, and computing the number of feature points which the difference in the positions of the feature points in the present frame and the feature points obtained by multiplication of the positions of feature points in the frame one before and the affine matrix is equal to or less than a determined threshold value, and selects the affine matrix that has the most feature points for which the difference is equal to or less than the determined threshold value, and wherein analyzing the movement of the time-series of the shot image is based on the affine matrix that is selected by the affine matrix selection portion.

17. A non-transitory computer readable storage medium having encoded thereon a computer program comprising a set of instructions when executed by a computer to implement a method comprising instructions that command a computer to function as:

a receiving portion that receives a shot image obtained in a time-series from an imaging apparatus;

a processing-analysis portion that performs image processing on the shot image and analyzes movement of the shot image resulting from movement of the imaging apparatus;

a conversion portion that converts the analyzed movement of the shot image into control data; and a control portion that controls functions based on the control data, wherein analyzing the movement of the time-series of the shot image includes setting a plurality of feature points in the shot image, and deriving a time-series of movement of the feature points using optical flow processing, wherein performing images processing further includes:

computing a plurality of affine matrixes that represent the relationship of positions of feature points in a present frame and positions of feature points in a frame one before using feature points selected at random, and computing the number of feature points which the difference in the positions of the feature points in the present frame and the feature points obtained by multiplication of the positions of feature points in the frame one before and the affine matrix is equal to or less than a determined threshold value, and selects the ante matrix that has the most feature points for which the difference is equal to or less than the determined threshold value, and wherein analyzing the movement of the time-series of the shot image is based on the affine matrix that is selected by the affine matrix selection portion.

18. The information processing apparatus according to claim 1, wherein deriving a time-series of movement of the feature points is performed by analyzing the shot image in a plurality of increasing resolutions, by first deriving the time-series of movement in a lower resolution and further refining the time-series of movement in a higher resolution.

19. An information processing apparatus comprising:

a shot image obtaining portion, including an imaging element, that obtains a shot image in a time-series from the imaging element;

an image processing portion that performs image processing on the shot image and analyzes movement of the shot image resulting from movement of the information processing apparatus;

a data conversion portion that converts the analyzed movement of the shot image into control data;

a control portion that controls functions based on the control data;

a display portion that displays a displayed object; and a drag-and-drop switch that is operable by a user for enabling a drag and drop function, wherein the control portion uses the control data as a basis for implementing the drag and drop function on the displayed object, such that an object is picked up when the drag-and-drop switch is pressed, the picked up object is moved while the drag-and-drop switch is held pressed, and the moved object is dropped when the drag-and-drop switch is released, wherein the image processing portion analyzes the movement of the time-series of the shot image by setting a plurality of feature points in the shot image, and deriving a time-series of movement of the feature points using optical flow processing, and wherein the image processing portion includes:

an affine matrix computation portion that computes a plurality of affine matrixes that represent the relationship of positions of feature points in a present frame and positions of feature points in a frame one before using feature points selected at random, and an affine, matrix selection portion that computes a, plurality of affine matrix scores corresponding to the plurality of affine matrixes, and further selects an affine matrix of the plurality of affine matrixes for which the corresponding affine matrix score is the highest, and wherein the image processing portion analyzes the movement of the shot image in the time-series based on the affine matrix that is selected by the affine matrix selection portion.

20. The information processing apparatus of claim 19, wherein the control portion enables the drag and drop function solely by operating the drag-and-drop switch without operating any other switch.

21. The information processing apparatus of claim 1, wherein the affine matrix selection portion computes a plurality of affine matrix scores corresponding to the plurality of affine matrixes, and further selects an affine matrix of the plurality of affine matrixes for which the corresponding affine matrix score is the highest.

22. The information processing apparatus of claim 19, wherein computing the plurality of affine matrix scores includes computing the number of feature points for which the difference in the positions of the feature points in the present frame and the feature points obtained by multiplication of the positions of feature points in the frame one before and the affine matrix is equal to or less than a determined threshold value.

* * * * *